(12) United States Patent
Dani et al.

(10) Patent No.: US 10,035,713 B2
(45) Date of Patent: Jul. 31, 2018

(54) FILTER HOUSING FOR FILTER AS YOU POUR FILTRATION

(71) Applicant: Brita LP, Oakland, CA (US)

(72) Inventors: Nikhil P. Dani, Pleasanton, CA (US); Jonathan McDonald, Danville, CA (US); Nicole Doan, Danville, CA (US); Jonathan Taylor Wiegele, Venice, CA (US)

(73) Assignee: Brita LP, Oakland, CA (US)

( * ) Notice: Subject to any disclaimer, the term of this patent is extended or adjusted under 35 U.S.C. 154(b) by 233 days.

(21) Appl. No.: 14/569,397

(22) Filed: Dec. 12, 2014

(65) Prior Publication Data

US 2016/0167980 A1 Jun. 16, 2016

Related U.S. Application Data

(63) Continuation-in-part of application No. 14/132,134, filed on Dec. 18, 2013.

(Continued)

(51) Int. Cl.
  *C02F 1/00* (2006.01)
  *C02F 1/28* (2006.01)
  (Continued)

(52) U.S. Cl.
  CPC ............ *C02F 1/003* (2013.01); *B01D 29/114* (2013.01); *B01D 35/30* (2013.01); *C02F 1/002* (2013.01);
  (Continued)

(58) Field of Classification Search
  None
  See application file for complete search history.

(56) References Cited

U.S. PATENT DOCUMENTS

| 313,320 A | 3/1885 | Goodale |
| 1,074,168 A | 9/1913 | Feinstein |

(Continued)

FOREIGN PATENT DOCUMENTS

| EP | 0402661 A1 | 12/1990 |
| EP | 0617951 A2 | 10/1994 |

(Continued)

OTHER PUBLICATIONS

CamelBak: "CamelBak Relay Water Pitcher," published Jan. 22, 2014, p. 1, XP054977371 . Retrieved from Internet: URL: https://www.youtube.com/watch?v=01TdZCF8AcY [retrieved on May 18, 2017].

(Continued)

*Primary Examiner* — Benjamin M Kurtz
(74) *Attorney, Agent, or Firm* — Thomas C. Feix

(57) ABSTRACT

A filter housing can be configured to receive a filter media to form a filter assembly. Water filter media housings can be adapted for filter-as-you-pour filtration in the context of container (e.g., pitcher) systems where filtering is achieved as the user pours water from the container. The filter housing can have a frame and an optional casing securable about the frame. A filter assembly can include a filter media within, connected to, or associated with a filter housing. The filter media can be securable in an at least partially curved configuration and/or within, connected to, or associated with the filter housing.

24 Claims, 15 Drawing Sheets

Related U.S. Application Data

(60) Provisional application No. 61/940,101, filed on Feb. 14, 2014.

(51) Int. Cl.
   | | | |
   |---|---|---|
   | *C02F 1/42* | (2006.01) | |
   | *B01D 35/30* | (2006.01) | |
   | *B01D 29/11* | (2006.01) | |
   | *A47J 31/60* | (2006.01) | |
   | *C02F 101/20* | (2006.01) | |
   | *C02F 101/12* | (2006.01) | |
   | *C02F 103/06* | (2006.01) | |

(52) U.S. Cl.
   CPC .............. *C02F 1/283* (2013.01); *C02F 1/42* (2013.01); *A47J 31/605* (2013.01); *C02F 2101/12* (2013.01); *C02F 2101/20* (2013.01); *C02F 2103/06* (2013.01); *C02F 2209/40* (2013.01); *C02F 2303/185* (2013.01); *C02F 2307/02* (2013.01); *C02F 2307/04* (2013.01)

(56) References Cited

U.S. PATENT DOCUMENTS

| | | | | |
|---|---|---|---|---|
| 2,689,048 | A | * | 9/1954 | Powers .............. B01D 29/111 210/457 |
| 3,016,984 | A | * | 1/1962 | Getzin .............. B01D 46/06 210/232 |
| 4,066,551 | A | | 1/1978 | Stern |
| 4,096,742 | A | | 6/1978 | Musolf et al. |
| 4,154,688 | A | * | 5/1979 | Pall .............. B01D 29/21 210/487 |
| 4,605,499 | A | | 8/1986 | Wise |
| 4,696,742 | A | | 9/1987 | Shimazaki |
| 4,764,274 | A | | 8/1988 | Miller |
| 4,948,499 | A | | 8/1990 | Peranio |
| 4,983,288 | A | | 1/1991 | Karbachsch et al. |
| 5,061,367 | A | | 10/1991 | Hatch et al. |
| 5,076,922 | A | | 12/1991 | DeAre |
| 5,225,078 | A | | 7/1993 | Polasky et al. |
| 5,681,463 | A | | 10/1997 | Shimizu et al. |
| 5,919,365 | A | | 7/1999 | Collette |
| 5,980,743 | A | | 11/1999 | Bairischer |
| 6,004,460 | A | | 12/1999 | Palmer et al. |
| 6,189,436 | B1 | | 2/2001 | Brooks |
| 6,193,886 | B1 | | 2/2001 | Nohren, Jr. |
| 6,368,506 | B1 | * | 4/2002 | Gebert .............. B01D 29/21 210/455 |
| 6,383,381 | B1 | | 5/2002 | O'Flynn et al. |
| 6,565,743 | B1 | | 5/2003 | Poirier et al. |
| 6,589,904 | B1 | | 7/2003 | Iwasaki et al. |
| 6,599,427 | B2 | | 7/2003 | Nohren et al. |
| 6,733,669 | B1 | | 5/2004 | Crick |
| 7,473,362 | B1 | | 1/2009 | Nohren, Jr. |
| 7,828,969 | B2 | | 11/2010 | Eaton et al. |
| 8,051,989 | B1 | * | 11/2011 | Tondreau .............. B01D 29/21 210/487 |
| 8,080,160 | B2 | | 12/2011 | Yanou et al. |
| 8,133,525 | B2 | | 3/2012 | Skalski et al. |
| 9,511,315 | B2 | | 12/2016 | Cur et al. |
| 2002/0020673 | A1 | | 2/2002 | Nohren et al. |
| 2002/0060176 | A1 | | 5/2002 | Mierau et al. |
| 2002/0066700 | A1 | | 6/2002 | Dolfel et al. |
| 2002/0083841 | A1 | | 7/2002 | Chaouachi et al. |
| 2002/0166811 | A1 | | 11/2002 | Walker et al. |
| 2005/0279768 | A1 | | 12/2005 | Chatrath |
| 2006/0144781 | A1 | | 7/2006 | Carlson et al. |
| 2007/0007296 | A1 | | 1/2007 | Guyot |
| 2008/0274312 | A1 | | 11/2008 | Schelling et al. |
| 2009/0139926 | A1 | | 6/2009 | Hassebrauck |
| 2009/0184042 | A1 | | 7/2009 | Steed et al. |
| 2010/0170839 | A1 | | 7/2010 | Kohl |
| 2010/0219151 | A1 | | 9/2010 | Risheq |
| 2010/0266351 | A1 | | 10/2010 | Vogel et al. |
| 2011/0079551 | A1 | | 4/2011 | Olson et al. |
| 2011/0079572 | A1 | | 4/2011 | Olson et al. |
| 2011/0247975 | A1 | | 10/2011 | Rapparini |
| 2011/0303589 | A1 | | 12/2011 | Kuennen et al. |
| 2011/0305801 | A1 | | 12/2011 | Beer |
| 2012/0017766 | A1 | | 1/2012 | Anson et al. |
| 2012/0055862 | A1 | | 3/2012 | Parekh et al. |
| 2012/0061312 | A1 | | 3/2012 | Busick et al. |
| 2012/0187036 | A1 | | 7/2012 | Risheq |
| 2012/0193282 | A1 | | 8/2012 | Wolf et al. |
| 2012/0214375 | A1 | | 8/2012 | Kitano et al. |
| 2012/0255890 | A1 | | 10/2012 | Cumberland |
| 2012/0298614 | A1 | | 11/2012 | Nelson |
| 2012/0325735 | A1 | | 12/2012 | Dicks et al. |
| 2013/0095212 | A1 | | 4/2013 | Beer |
| 2013/0125748 | A1 | | 5/2013 | Taylor et al. |
| 2013/0156897 | A1 | | 6/2013 | Goldstein |
| 2013/0175228 | A1 | | 7/2013 | Utsch et al. |
| 2013/0233690 | A1 | | 9/2013 | Melzer |
| 2013/0319927 | A1 | | 12/2013 | Lin |
| 2015/0166364 | A1 | | 6/2015 | Wiegele |
| 2016/0376161 | A1 | | 12/2016 | Dani et al. |
| 2016/0376162 | A1 | | 12/2016 | Dani et al. |
| 2016/0376163 | A1 | | 12/2016 | Dani et al. |
| 2016/0376164 | A1 | | 12/2016 | Dani et al. |
| 2016/0376165 | A1 | | 12/2016 | Dani et al. |
| 2017/0001880 | A1 | | 1/2017 | Dani et al. |

FOREIGN PATENT DOCUMENTS

| | | |
|---|---|---|
| GB | 2268680 A | 1/1994 |
| GB | 2280596 A | 2/1995 |
| JP | 657489 U | 8/1994 |
| WO | 0071468 A1 | 11/2000 |
| WO | 2011145640 A1 | 11/2011 |
| WO | 2012031853 A1 | 3/2012 |
| WO | 2012150506 A2 | 11/2012 |
| WO | 2013044079 A1 | 3/2013 |
| WO | 2013088260 A1 | 6/2013 |
| WO | 2014089207 A1 | 6/2014 |
| WO | 2017055915 A1 | 4/2017 |
| WO | 2017055918 A1 | 4/2017 |

OTHER PUBLICATIONS

NPL-1 ("Activated Carbon Filter Bags ", Filterek) Date: Jun. 4, 2012.
NPL-1 ("Activated Carbon Filter Bags", Filterek) Date: Jun. 4, 2012.
Oxford Dictionary Definition—coextensive, 2017, 1 page.
Oxford Dictionary Definition—immediately, 2017, 1 page.
Supplementary European Search Report EP 14870910,8, dated Jun. 8, 2017.
Supplementary European Search Report EP 14871227.6, dated Jun. 8, 2017.
Supplementary European Search Report EP 14871467.8, dated Jun. 8, 2017.
Supplementary European Search Report EP 14871701.0 dated Jun. 8, 2017.
Supplementary European Search Report EP 14871914.9, dated Jun. 13, 2017.
Supplementary European Search Report EP 14872175.6, dated Jun. 8, 2017.

* cited by examiner

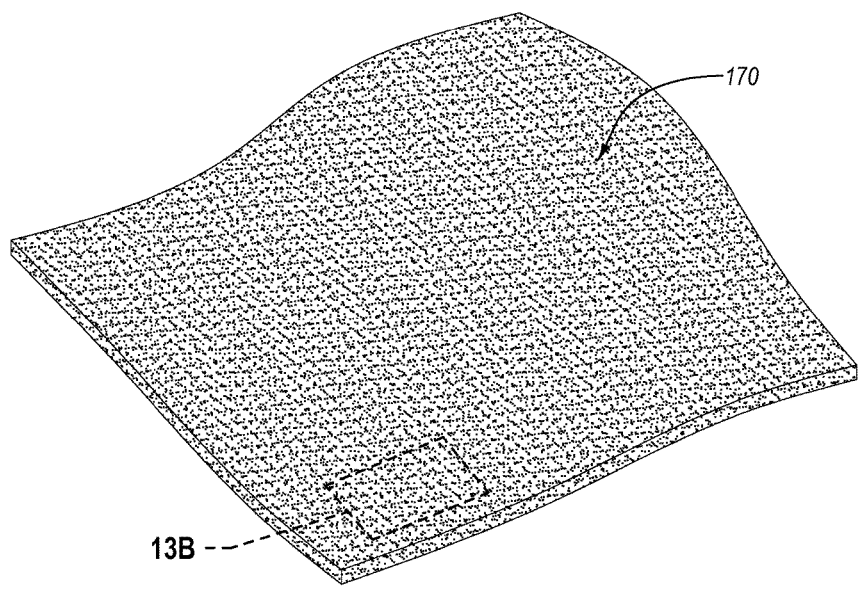
FIG. 13A
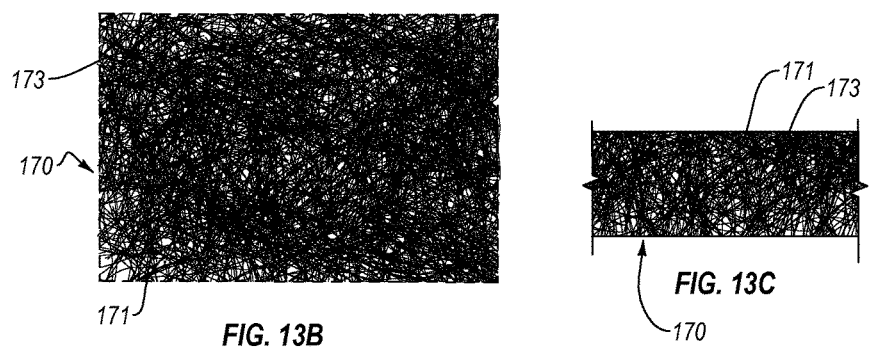
FIG. 13B
FIG. 13C

FILTER HOUSING FOR FILTER AS YOU POUR FILTRATION

CROSS-REFERENCE TO RELATED APPLICATIONS

The present application claims the benefit of U.S. Provisional Patent Application Ser. No. 61/940,101, filed Feb. 14, 2014. The present application is also a continuation-in-part of U.S. patent application Ser. No. 14/132,134, filed Dec. 18, 2013. The disclosure of each of the above applications is incorporated herein by reference in its entirety.

BACKGROUND

1. Technical Field

The present disclosure relates generally to filter housings, and more specifically, filter housings configured to receive a filter media to form a filter assembly. In particular, the present disclosure relates to water filter media housings adapted for filter as you pour (i.e., filter-as-you-pour) filtration in the context of container (e.g., pitcher) systems where filtration is achieved as the user pours water from the container.

2. Related Technology

Drinking water, such as water from water purification facilities or well water, can contain certain additives or contaminants (referred to herein collectively as contaminants) such as chlorine, chloramines or various organic components. Chlorine is typically intentionally added to water to control microbes. For some, chlorinated water imparts an unpleasant taste or smell. Its presence may also raise health concerns to some consumers.

Existing filter housings for pour through pitcher systems allow a user to fill an upper reservoir of the pitcher with water, which then passes (under force of gravity and/or at atmospheric pressure) through a filter media within a filter housing situated at the bottom of the reservoir to remove contaminants from the water. The filtered water then exits the filter housing downward into the main body of the pitcher, and may then be poured therefrom, providing filtered water for drinking. In such filter systems, the water is filtered as the pitcher is filled therewith. Accordingly, such systems can be termed "filter as you fill" systems.

One disadvantage of existing filter as you fill systems is that it may take several minutes for water introduced into the reservoir of such a system to be filtered, and ready for drinking. It would be beneficial to provide a filter housing that can accommodate (gravitational) filtration of water as it is poured from a pitcher and achieves acceptable levels of contaminant removal such that the time required to filter may be reduced and/or while optionally requiring less filter media than alternative filters. Some previous systems also failed to properly seat the filter media within the filter media housing or properly seat the filter assembly within the filter device, resulting in water bypassing the filter as it flows into the pitcher. Such fluid bypass may result in consumption of unfiltered water. It would be beneficial to provide a filter housing and filter assembly that may prevent, inhibit, or reduce such fluid bypass to ensure filtration prior to consumption.

BRIEF SUMMARY OF THE PRESENT DISCLOSURE

Various implementations of the present disclosure overcome or solve one or more of the foregoing or other problems in the art with a filter housing configured to receive a filter media to form a filter assembly. For instance, one or more implementations of the present disclosure include a water filter media housing adapted for filter-as-you-pour filtration in the context or environment of container (e.g., pitcher) systems where filtration is achieved as the user pours water from the container. At least one implementation includes a filter housing having a frame and/or a casing. In some implementations the optional casing can be securable about the frame. Another implementation includes a filter assembly having a filter media within, connected to, or associated with the filter housing. Further implementations include a filter media securable in an at least partially curved configuration and/or within, connected to, or associated with the filter housing. In one or more implementations, gravitational force(s) comprise the major forces that move the fluid through the system and/or filter media thereof to achieve acceptable levels of contaminant removal, in less time and/or with less filter media than alternative systems.

Additional features and advantages of exemplary implementations of the present disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

To further clarify the above and other advantages and features of the present disclosure, a more particular description of the disclosure will be rendered by reference to specific embodiments or implementations thereof which are illustrated in the drawings located in the specification. It is appreciated that these drawings depict only typical embodiments or implementations of the present disclosure and are therefore not to be considered limiting of its scope. The present disclosure will be described and explained with additional specificity and detail through the use of the accompanying drawings in which:

FIG. 13A illustrates a perspective view of an exemplary filter media according to an implementation of the present disclosure;

FIG. 13B illustrates a detailed view of the filter media of FIG. 14A;

FIG. 13C illustrates another detailed view of the filter media of FIG. 14A;

DETAILED DESCRIPTION

Figure 1A:
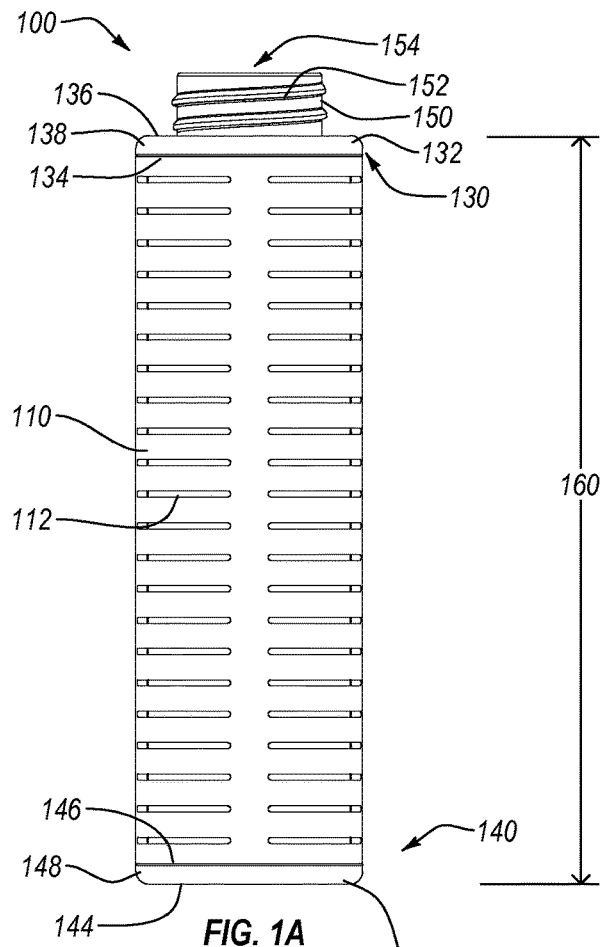
FIG. 1A illustrates a facing view of an exemplary filter housing according to an implementation of the present disclosure.

Before describing the present disclosure in detail, it is to be understood that this disclosure is not limited to particularly exemplified systems or process parameters that may, of course, vary. It is also to be understood that the terminology used herein is only for the purpose of describing particular embodiments or implementations of the present disclosure, and is not intended to limit the scope of the invention in any manner.

All publications, patents, and patent applications cited herein, whether supra or infra, are hereby incorporated by reference in their entirety to the same extent as if each individual publication, patent, or patent application was specifically and individually indicated to be incorporated by reference.

As used herein, the term "comprising" which is synonymous with "including," "containing," or "characterized by," is inclusive or open-ended and does not exclude additional, un-recited elements or method steps.

It will be noted that, as used in this specification and the appended claims, the singular forms "a," "an" and "the" include plural referents unless the content clearly dictates otherwise. Thus, for example, reference to a "support member" includes one, two, or more support members.

As used in the specification and appended claims, directional terms, such as "top," "bottom," "left," "right," "up," "down," "upper," "lower," "proximal," "distal," "front," "rear," and the like are used herein solely to indicate relative directions and are not otherwise intended to limit the scope of the disclosure or claims.

Where possible, like numbering of elements have been used in various figures. Furthermore, multiple instances of an element and or sub-elements of a parent element may each include separate letters appended to the element number. For example, two instances of a particular element "111" may be labeled as "111a" and "111b". In that case, the element label may be used without an appended letter (e.g., "111") to generally refer to instances of the element or any one of the elements. Element labels including an appended letter (e.g., "111a") can be used to refer to a specific instance of the element or to distinguish or draw attention to multiple uses of the element.

Furthermore, an element label with an appended letter can be used to designate an alternative design, structure, function, implementation, and/or embodiment of an element or feature without an appended letter. For instance, an element "124" can comprise a first element type "124a" and a second element type "124b." Likewise, an element label with an appended letter can be used to indicate a sub-element of a parent element.

Various aspects of the present devices and systems may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present. Furthermore, as used herein, the terms "connection," "connected," and the like do not necessarily imply direct contact between the two or more elements.

Various aspects of the present devices, systems, and methods may be illustrated with reference to one or more exemplary embodiments or implementations. As used herein, the term "exemplary" means "serving as an example, instance, or illustration," and should not necessarily be construed as preferred or advantageous over other embodiments or implementations disclosed herein.

Unless defined otherwise, all technical and scientific terms used herein have the same meaning as commonly understood by one of ordinary skill in the art to which the present disclosure pertains. Although a number of methods and materials similar or equivalent to those described herein can be used in the practice of the present disclosure, the preferred materials and methods are described herein.

The present disclosure extends to a filter housing configured to receive a filter media to form a filter assembly. For instance, one or more implementations of the present disclosure include a water filter media housing adapted for filter-as-you-pour filtration in the context or environment of container (e.g., pitcher) systems where filtration is achieved as the user pours water from the container. At least one implementation includes a filter housing having a frame and/or a casing. In some implementations the optional casing can be securable about the frame. Another implementation includes a filter assembly having a filter media within, connected to, or associated with the filter housing. Further implementations include a filter media securable in an at least partially curved configuration and/or within, connected to, or associated with the filter housing. In one or more implementations, gravitational force(s) comprise the major forces that move the fluid through the system and/or filter media thereof to achieve acceptable levels of contaminant removal, in less time and/or with less filter media than alternative systems.

In certain implementations, a filter housing can include a frame comprising a body extending between a first end and an opposing second end. The body can comprise one or more support members. At least one of the one or more support members can extend at least partially between the first and second ends. For instance, a first support member can extend from the first end to the opposing second end. In at least one implementation, the one or more support members can include a plurality of support members extending at least partially between the first and second ends. The one or more support members can form, comprise, or provide a framework for supporting, receiving, and/or securing at least a portion of a filter media.

The one or more support members can also comprise a first support member extending at least partially between the first and second ends and a second support member extending at an angle from the first support member. For instance, the second support member can extend perpendicular to the first support member. One will appreciate, however, that other suitable angles are contemplated and disclosed herein. Indeed, any suitable relationship between first and second support members can be incorporated into certain implementations of the present disclosure.

In some implementations, at least a portion of the body comprises a tubular configuration. For instance, the body or a portion thereof can comprise a cylinder or other substantially cylindrical configuration. In other implementations, the body can comprise a partially cylindrical configuration. One will appreciate, however, that the present disclosure is not limited to circular, cylindrical configurations. Other shapes, including geometric and/or rounded non-cylindrical configurations are also contemplated and disclosed herein. For instance, a first portion of the body can comprise a tubular cylindrical configuration, while a second portion of the body comprises a planar or squared tubular configuration. Thus, certain implementations can comprise a hybrid body having one or more rounded sides or portions and one or more straight, flat, or planar sides or portions.

In an implementation having a tubular body, the one or more support members can form, comprise, and/or provide a framework at least partially bounding a channel, cavity, or void at least partially disposed within the tubular body. For instance, one or more support members can extend axially (e.g., along the length of the body) at least partially between the first and seconds ends to form a framework. In some implementations, one or more support members can extend at an angle from the one or more axially extending support members. One will appreciate, however, that support members extending in a plurality of directions is not necessarily required to provide such a framework. Thus, the one or more support members can comprise an outer framework of the tubular body.

In some implementations, one or more support members can extend circumferentially about the frame or body thereof. For instance, one or more support members can extend circumferentially around, between, or otherwise about one or more axially extending support members. In at least one implementation, a circumferentially extending support member can wind or spiral at least partially between the first and seconds ends. In other implementations, a circumferentially extending support member can extend at least partially around the frame or body in a planar manner, cross-section, or other non-spiraling configuration.

One will appreciate, however, that reference to a circumferentially extending support member is not limited to circular, cylindrical, or other curved or rounded configurations. Indeed, as used herein, the terms "circumference," "circumferential," "circumferentially," and the like apply equally to cylindrical and non-cylindrical, circular and non-circular, and rounded or non-rounded configurations. Therefore, unless otherwise indicated, reference to one or more of a circumference, a perimeter, a surface distance, or other similar measurement applies equally to circular-cylindrical, partially cylindrical, substantially cylindrical, cylinder-like, or other tubular frames or bodies, including square-tubular, oval-tubular, or any other geometric or curved shape or configuration.

The body can also have one or more openings (e.g., through or (disposed) between the one or more support members). The one or more openings can comprise, occupy, and/or eliminate about 10%, 20%, 30%, 40%, 50%, 60%, 70%, 80%, or 90% of the surface area of the body. Ranges including two or more of the foregoing values are also contemplated herein. The one or more openings can be in fluid communication with a channel, cavity, or void at least partially bound by the frame or body. Thus, certain implementations can include a frame at least partially bounding a channel disposed at least partially within the body and extending at least partially between the first and second ends of the frame, wherein the one or more openings are in fluid communication with the channel.

In an illustrative implementation, the frame comprises a tubular body at least partially bounding a central cavity or channel and extending between first and second opposing ends. The central cavity or channel can also extend at least partially between the first and second ends. The body can also have a plurality of support members and a plurality of openings disposed between the support members, the openings being in fluid communication with the channel.

In some implementations, the first end of the body can have one or more openings or apertures. For instance, the first end can have an aperture in fluid communication with the channel disposed at least partially within the frame or body thereof. The first end can also include an attachment mechanism. For instance, the attachment mechanism can be configured for connecting the frame to a filter device or portion thereof. In at least one implementation, the attachment mechanism can include a threaded element (e.g., for rotatably connecting the frame to a filter device, lid, or other apparatus). The attachment mechanism can also comprise one or more fasteners. A fastener according to certain implementations can include a clasp, a hook, a lock, a socket, a post, a lock-and-key type element, a mating member, an adhesive, or any other fastener suitable for connecting a frame to an apparatus.

The first end can also include a capping member or other structural element (e.g., at a first terminal end of the frame—the first terminal end corresponding or adjacent to the first end). In at least one implementation, the capping member comprises a first surface, an opposing second surface, and an outer edge disposed therebetween. For instance, the capping member can include a flange extending circumferentially about the capping member, the flange including the first surface, opposing second surface, and outer edge. In an implementation, one or more support members can extend from the first surface of the capping member toward (or to) the opposing second end of the body. In an implementation, the fastener can extend from the second surface.

In an illustrative implementation, the first end comprises a cap having one or more apertures in fluid communication with the channel disposed at least partially within the frame or body. The fastener can also include one or more apertures in fluid communication with the channel and/or one or more apertures of the cap.

The second end can also include a cap, disk, lip, flange, or other structural element. The structural element can provide a physical separation between the body (or element(s) thereof) and a second terminal end of the frame—the second terminal end corresponding or adjacent to the second end. In at least one implementation, the second end comprises a cap having a first surface, an opposing second surface, and an outer edge disposed therebetween. The cap can also include a flange extending circumferentially about the cap, the flange including the outer edge. In an implementation, the one or more support members can extend from the first surface of the cap toward (or to) the opposing first end. In an implementation, the second end or cap thereof can comprise a closed configuration.

In an implementation, the first and second ends are separated by a length and the filter housing can have a (cross-sectional) width transverse to the length. In at least one implementation, the length is greater than the width. For instance, the length can be twice the width, three times the width or more. The length can also be less than twice the width. In at least one implementation, the length can be about or approximately 110 mm and the width can be about or approximately 36 mm. One will appreciate, however, that the length can be less than about 110 mm. For instance, the length can be less than about 20 mm, between about 20 mm and about 50 mm, between about 50 mm and about 75 mm, or between about 75 mm and about 100 mm.

In other implementations, the length can be greater than about 110 mm. For instance, the length can be between about 110 mm and about 125 mm, between about 125 mm and about 150 mm, or between about 150 mm and about 200 mm. The length can also be greater than about 200 mm. Indeed, in some implementations, the length can be hundreds or even thousands (or more) of millimeters, centimeters or other suitable units of measurement. Furthermore, the length can be any length or range of lengths within the ranges disclosed herein.

Likewise, the width can be less than about 36 mm. For instance, the width can be less than about 10 mm, between about 10 mm and about 20 mm, between about 20 mm and about 30 mm, or between about 30 mm and about 36 mm. In other implementations, the width can be greater than about 36 mm, for instance, between about 36 mm and about 40 mm, between about 40 mm and about 50 mm, between about 50 mm and about 100 mm, or greater than about 100 mm. Indeed, in some implementations, the width can be hundreds or even thousands (or more) of millimeters, centimeters or other suitable units of measurement. Furthermore, the width can be any length or range of lengths within the ranges disclosed herein.

In other implementations, the length can alternatively be approximately equal to the width. For instance, the length and width can be about or approximately 80 mm. One will appreciate, however, that other suitable dimensions, including those within the ranges disclosed herein, are contemplated and disclosed herein. In some implementations, the length is greater than or approximately equal to the width. In other implementations, the length can be less than the width.

In certain implementations, the width of the frame or body thereof can comprise a diameter of a cylindrical, partially cylindrical, substantially cylindrical, cylinder-like, or other tubular frame or body. Unless otherwise indicated, reference to one or more of a width, a diameter, a radius, a cross-section distance, or other similar measurement applies equally to circular-cylindrical, partially cylindrical, substantially cylindrical, cylinder-like, or other tubular frames or bodies, including square-tubular, oval-tubular, or any other geometric or curved shape or configuration.

In some implementations, the filter housing can optionally comprise a casing. For instance, the casing can be securable about the frame. In an implementation, at least a portion of the casing can at least partially cover, surround, or enclose at least a portion of the body. For instance, the casing can be secured about the frame such that the casing extends from the first end of the frame at least partially or completely to the second end of the frame. In at least one implementation, the casing can extend circumferentially around or about, or can surround the entire body of the frame.

In one or more implementations, the casing can be securable about the frame while maintaining a space between at least a portion of the casing and at least a portion of the frame. For instance, the casing can be secured about or around the frame such that a space remains between at least a portion of the casing and at least a portion of the body or support member(s) thereof. In certain implementations, the space can comprise a filter media receiving area. In other implementations (e.g., implementations lacking an optional outer casing), the filter media receiving area can comprise the space around or about the frame (or body thereof).

The space can extend circumferentially around all or at least a portion of the body such that a filter media can be secured, maintained, received, and/or installed within the space or receiving area. For instance, the filter media can be wrapped around the entire body, at least a portion of the body, or one or more portions of the body and/or other portion(s) of the frame. Thus, the filter housing can be configured to receive a filter media in the space between at least a portion of the casing and at least a portion of the frame (and/or in the space around or about the frame (or body thereof)) such that a fluid passing through the space or between the casing and the frame is filtered by the filter media.

In an implementation, the filter media can be secured about the frame (or body thereof) via one or more securing mechanisms. Illustrative securing mechanisms can include fasteners such as staples, tacks, clasps, clamps, pins, gripping elements, VELCRO®, straps, (rubber) bands, ties, zips, latches, hooks, locks, etc. Illustrative securing mechanisms can also include adhesives such as glue, tape, tacky strips, sticky material, etc. Illustrative securing mechanisms can also include tucking or inserting one or more portions of the filter media (e.g., into a slot in the filter housing), folding and/or overlapping the filter media, casting, and/or securing the filter media (e.g., to the filter housing or component(s) thereof).

In an implementation, the casing can be securable about the frame and about one or more caps or flanges of the first and/or second ends. For instance, the casing can be secured about the frame between the respective caps or flanges of the first and second ends. Illustratively, the casing can extend from the first surface of the cap of the first end of the frame toward (or to) the first surface of the cap of the opposing second end of the frame. Thus, the casing can surround, enclose, or encase, at least partially, the entire body of the frame.

In an implementation, the casing can comprise one or more casing members. For instance, the casing can comprise a plurality of casing members attached, connected, or secured about at least a portion of the frame. In an alternative implementation, the casing can comprise a sleeve configured to slide or be slid into position about the frame or portion thereof.

The casing can also comprise a notch or other structural feature. In at least one implementation, the notch can properly align the casing about the frame or body thereof. For instance, the notch can mate or align with a slot in the frame or body thereof. In some implementations, the notch can be insertedly mated with the slot in a secured configuration. The notch can also secure, hold, reinforce, or support a portion of a filter media within the slot. For instance, the notch can provide a mechanism for retaining the portion of the filter media in the slot. In other implementations, the casing can be secured to the frame or body by a fastener or attachment mechanism. However, in at least one implementation, the casing can be securable about the frame or body thereof without being secured to the frame by any fastener or attachment mechanism.

In certain implementations, the casing can comprise one or more openings. For instance, the one or more openings can be in fluid communication with the channel (e.g., via the one or more openings in the body). The one or more openings can comprise, occupy, and/or eliminate about 10%, 20%, 30%, 40%, 50%, 60%, 70%, 80%, or 90% of the surface area of the casing. Ranges including two or more of the foregoing values are also contemplated herein.

In an illustrative implementation, the one or more openings in the casing, the receiving area or space between at least a portion of the casing and at least a portion of the frame, the one or more openings in the body, the channel, and/or the aperture of the first end (or any suitable combination thereof) can form or comprise a fluid flow path. Thus, the filter media (e.g., within the receiving area) can be positioned in the fluid flow path such that a fluid passing through the fluid flow path, (or between the one or more openings in the casing and the one or more openings in the body; or through the receiving area or space) can be filtered or processed by the filter media.

Certain implementations of the present disclosure can include a filter assembly comprising a filter housing and a filter media (e.g., disposed within the filter housing). The filter assembly (or filter media thereof) can be configured to filter (unfiltered) water within a pitcher or other container as it is poured therefrom, while at the same time providing a (minimum) flow rate of water through an outlet thereof that is at least about 0.3 gallons per minute (GPM), at least about 0.4 GPM, at least about 0.5 GPM, at least about 0.6 GPM, at least about 0.7 GPM, at least about 0.75 GPM, at least about 0.8 GPM, at least about 0.85 GPM, at least about 0.9 GPM, at least about 0.95 GPM, at least about 1.0 GPM, at least about 1.5 GPM, or at least about 2.0 GPM, and/or any value or range of values included therein.

In an implementation, the filter assembly (or filter media thereof) can be configured to provide and allow for fluid filter and/or exit flow rates from about 0.3 GPM to about 2 GPM, from about 0.3 GPM to about 1 GPM, or from about 0.5 GPM to about 0.8 GPM, and/or any value or range of values included therein. Such flow rates are typically not possible with filter assemblies including granulated, particulate, and/or block filter media typically employed in gravity fed water filtration systems (e.g., that include a reservoir into which unfiltered water is introduced) in which water trickles through the filter assembly and into the container body (e.g., pitcher), where it can then be poured therefrom. For example, filter assemblies based on such filter media typically require 3 to 8 minutes to filter 1 liter of water (i.e., 0.03 GPM to 0.09 GPM filtration of water).

In some implementations, the filter assemblies of the present disclosure (or filter media thereof) can provide for filtration flow rates that are faster than those of existing (gravitational, filter as you fill, and/or filter as you pour) systems and/or filter media (e.g., such as those flow rates described above). For instance, in certain implementations, the filter media comprises at least one activated carbon textile material arranged within the filter assembly so as to present at least one curved surface to the flow stream of water. In some implementations, such textile material(s) disposed so as to present a curved surface to the flow stream of water can surprisingly and unexpectedly been found to provide and allow for significantly faster flow rates (e.g., as compared to the 3 to 8 minutes to filter 1 liter of some existing systems and/or filter media). For example, exit flow rates can be from about 0.3 GPM to about 2 GPM, from about 0.3 GPM to about 1 GPM, or from about 0.5 GPM to about 0.8 GPM, and/or any value or range of values included therein.

As described above, the filter media can comprise an activated carbon or other textile material (e.g., an activated carbon-containing or -comprising textile material). As used herein, a textile material refers to any one of a class or group of materials having or comprising one or more of a variety of compositions and/or configurations, including but not limited to fibrous materials, felt or felt-like materials, yarn or yarn-like materials, woven materials, non-woven materials, and/or braided materials. Such textile materials can include bendable materials, flexible materials, moldable materials, non-granular materials, non-particulate materials, non-block materials, granular or particulate impregnated, entwined, and/or incorporated materials, low pressure drop materials, and/or composites or compositions of, having, or comprising one or more thereof. In one or more implementations, an activated carbon textile material can comprise a non-granular, non-particulate, non-block, activated carbon textile (ACT) material, except granular, particulate, and/or block (carbon) can be impregnated, entwined, and/or incorporated therein in certain implementations.

In at least one implementation, the filter media can comprise a non-granular, non-particulate, non-block, activated carbon textile (ACT) material (e.g., with or without granular and/or particulate carbon impregnated, entwined, and/or incorporated therein). The ACT material can be fibrous without being ordered and/or configured in a consistent or other pattern (e.g., so that fibers of the material are matted together). Such a fibrous material can exhibit very high porosity characteristics, allowing and/or providing for relatively high flow rates (e.g., as described herein) of water or other fluid therethrough. Without being bound to history or any theory, such porosity and associated flow rate characteristics are not generally possible with traditionally employed filter media, such as a monolithic activated carbon block, a bed of activated carbon granules or particles, etc.

Exemplary textile materials can have a thickness from about 0.5 mm to about 2 mm (e.g., about 0.75 mm to about 1 mm). However, a thickness less than about 0.5 mm (e.g., about 0.1, about 0.25, etc.) or greater than about 2 mm (e.g., about 2.5 mm, about 3 mm, about 4 mm, about 5 mm, about 10 mm, etc.) is also contemplated herein. Indeed, any of the above numeric values of thickness in units of centimeters, inches, etc. can also be suitable in certain implementations.

The fibers of the textile material can have any suitable diameter, gauge, or similar measurement (e.g., less than 0.1 μm, from about 0.1 μm to about 20 μm, greater than 20 μm, etc.). Without being bound to theory, it is believed that the fibrous characteristics of the textile material from which the filter media is formed can be at least in part responsible for observed and/or relatively high flow rates. Such characteristics are believed to exhibit higher ratios of surface area to volume than possible with, for example, filter media foam substrates, providing superior filtration effectiveness and/or efficiency characteristics than may be possible with a single pass through a typical foam filter media material (e.g., under similar space constraints, using similar amounts of filter media, under similar use conditions, and/or at a similar material and/or manufacturing cost). For example, the efficiency available with a comparable amount of foam filter media may be only about ⅓ that provided by granulated activated carbon filter media, or the described textile material-containing filter media. Such textile materials also provide lower flow resistance than available when using granulated activated carbon filter media, making possible the desired relatively high flow rates. One will appreciate, however, that other suitable filter media can be configured for use in the present disclosure.

The textile material of the filter media can be formed from structural elements selected from the group consisting of fibers, yarns, filaments, flexible porous composites, combinations thereof, etc., which may be joined into a textile material. Such textile materials may typically be comprised of relatively high aspect ratio structural elements whose length is orders of magnitude (e.g., 1-5 orders of magnitude) larger than the diameter or other cross-sectional measurement.

Such textile materials also may have varying degrees of structural integrity based on the amount, size, and distribution of the structural elements. For example some textile structures may have the structural elements loosely held generally parallel to each other while in other embodiments the structural elements may be twisted around a longitudinal axis or they may be interlaced orthogonally relative to each other or they may be randomly oriented relative to each other. The physical dimensions and orientation of the structural elements of the textile material also create a depth to thickness ratio for the resulting textile material, along with pores of various sizes.

For best use in water filtration applications, these textile materials preferably may have an optimal combination of thickness and pore size distribution to not only allow water to flow at the desired flow rate, but also contain enough mass of material to enable desired levels of contaminant reduction, while having enough physical integrity to prevent the structural elements the textile material is made of from being dislodged by the water penetrating through it.

By way of non-limiting example, a textile material employed as filter media may have properties as shown in Table 1 below.

TABLE 1

| Property | Specification |
| --- | --- |
| Basis Weight | 25-200 g/m2 |
| Thickness | 0.5-5.0 mm |
| Iodine Number | 500-3000 mg/g |
| Pore size distribution (avg.) | 5-1000 μm |
| Fiber diameter (avg.) | 1-50 μm |

Furthermore, and without being bound to theory, although filtering foam filter media can offer gravity fed flow rates therethrough that are higher than those possible with granulated or monolithic activated carbon, such foam filter systems are not particularly efficient in removing chlorine or other contaminants. For example, to achieve a desired target removal efficiency (e.g., percent removal over time), a greater amount of foam material (than the amount of granular material or filter media of the present disclosure) may be required. In addition, a single pass through such foam material may not provide as high a degree of contaminant removal as a single pass through monolithic or granulated activated carbon, as well as implementations of the present disclosure. For example, given a comparable amount of filtering material or media, typical filtering foam may remove only about ⅓ as much chlorine in a single pass and/or under similar conditions as the filter media of certain implementations of the present disclosure (e.g., under typical use conditions).

As a result, some products relying on filtration using a foam filter media pass the water through the foam filter media multiple times (e.g., both upon entry and exit from the container) in order to achieve an acceptable level of contaminant removal efficacy. Such multi-pass purification can frustrate users and/or consumers, especially in gravity flow systems and/or at atmospheric pressure. Similarly, some products rely on filtration using a greater amount of foam filter media or foam filter media at a greater density in order to achieve an acceptable level of contaminant removal efficacy. Such approaches can increase the cost of materials and/or the time requirement to achieve an acceptable level of contaminant removal, again frustrating users and/or consumers, especially in gravity flow systems and/or at atmospheric pressure.

By employing the fibrous and/or textile material(s) described herein, however, certain implementations of the present disclosure can be capable of (1) achieving contaminant removal efficacy or efficiencies (e.g., at least 80%, at least 85%, at least 90%, at least 95%, or at least 99% chlorine removal in a first pass) comparable to those achieved by products employing monolithic or granulated activated carbon filter media (e.g., about 3 times greater than that provided by foam under similar space constraints, using similar amounts of filter media, and/or at a similar material and/or manufacturing cost), (2) at flow rates that are significantly higher (e.g., at least about 0.3 GPM) than granulated activated carbon, which makes practical implementation of a filter-as-you-pour container system possible.

Stated another way, the filter-as-you-pour systems of the present disclosure employ a textile filter media material arranged so as to present a curved surface to inflowing water to be filtered. The configurations allow for relatively compact filter assemblies capable of providing performance equivalent or similar to larger (e.g., greater surface area of filter media) or multi-stage systems. The filter-as-you-pour system places textile filter media material in the path of water flowing out from the container body under gravity-flow conditions. Under such conditions, with a known porous filter material constant bulk density, Darcy's law applies:

$$k = \frac{QL\mu}{\rho g A \Delta P}$$

| Symbol | Variable | Typical Units Metric (English) | Typical Operating Range |
| --- | --- | --- | --- |
| k | Intrinsic Permeability | cm/s (ft/s) | $1.2 \times 10^{-7}$-$3.7 \times 10^{-4}$ ($4 \times 10^{-9}$-$1.2 \times 10^{-5}$) |
| Q | Flow Rate | L/min (gal/min) | 0.75-7.5 (0.2-2.0) |
| L | Path Length | cm (in) | 0.1-0.5 (0.04-0.2) |
| μ | Dynamic Viscosity | g/cm-s (lbf/ft-s) | 0.9-1.4 (0.06-0. |

-continued $$k = \frac{QL\mu}{\rho g A \Delta P}$$

| Symbol | Variable | Typical Units Metric (English) | Typical Operating Range |
|---|---|---|---|
| ρ | Fluid Density | g/cm³ (lb/ft³) | 1.00 (62.4) |
| G | Gravity Acceleration | cm/s² (ft/s²) | 980.665 (32.174) |
| A | Surface Area | cm2 (ft²) | 50-650 (0.05-0.60) |
| ΔP | Pressure Differential | cm H₂O (lb/in²) | 5-15 (0.07-0.22) |

Figure 15:
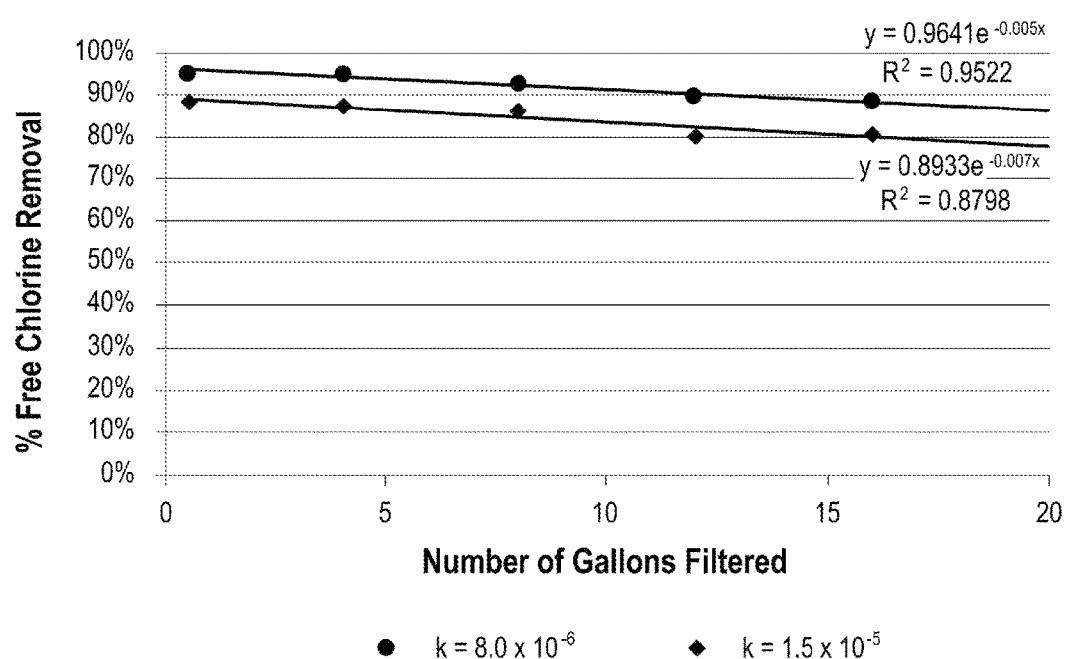
FIG. 15 is a graph illustrating decrease in free chlorine removal with increasing throughput.

For a given filter material density and associated permeability, the removal efficiency for a given water contaminant (e.g., chlorine) can be related directly to the mass load of that constituent over time. For a constant influent concentration (e.g., the unfiltered water all includes the same chlorine concentration), removal efficiency can be related to total flow throughput. For a first-order reaction, such as that characteristic of free chlorine degradation or adsorption on activated carbon, this follows an exponential curve. As permeability increases, contaminant removal decreases. The filter-as-you-pour configuration and textile filter media material described has the advantage of providing higher contaminant removal efficiency at higher permeability than alternative methods. Because of these advantages, this allows relatively smaller filtration assemblies, and/or better removal efficiencies. FIG. 15 illustrates exemplary contaminant removal profiles for two different permeability values over a portion of the life of a filter assembly.

Such filter assemblies may have a life of at least about 20 gallons, at least about 30 gallons, at least about 40 gallons, from about 40 to about 80 gallons, etc. At the end of its life the filter assembly may still achieve chlorine removal of at least 60%, at least 70%, or at least 75%. The filter assemblies may meet applicable NSF/AISI 42 standards. As shown in FIG. 15, the contaminant removal efficiency may be relatively consistent over the life of the filter assembly (e.g., within ±30%, within ±25%, within ±20%, within ±10%, or within ±5% of a lifetime average removal efficiency.

In one or more implementations, the filter media (e.g., the textile material) can comprise one or more layers that are wrapped around the frame (or body thereof) to form the filter assembly. The optional casing or covering can then be secured about the frame to retain the filter media within the receiving area or space between the frame and casing and/or maintain at least a portion of the filter media in a curved configuration. In such an implementation, the textile material can present a curved outer surface to water (or other fluid) entering the filter assembly (e.g., laterally or radially through one or more openings in the outer casing). One will appreciate, however, that the textile material can also or alternatively present a curved inner surface to water passing through the filter assembly (e.g., through one or more openings in the inner frame or body). By positioning the filter media so that at least a portion thereof presents a curved, rather than planar surface, the inventors have surprisingly and unexpectedly found that flow rates through the filter media are significantly increased.

To accommodate the same, the filter assembly can be mounted generally or substantially vertically within a pitcher or other storage container (e.g., attached to a lid thereof). Fluid (e.g., water) can then be filtered as it is poured into the container through the filter opening in the upper end of the filter assembly. Alternatively (or in addition), filtered or unfiltered water within the container can be filtered as it is poured from the container by tipping the container, allowing the water or other fluid to enter the filter assembly (laterally and/or radially) through curved surface of the filter media and/or the outer openings in the casing and pass through the filter media (e.g., in the receiving area) and into the (central or internal) channel (e.g., via one or more openings in the frame or body thereof). The filtered water within the channel can then be poured from the upper opening in the first end at a desirable flow rate (e.g., faster than previous filtration systems).

Thus, an exemplary flow path along which the water can pass as it moves through the filter assembly can begin at the opening(s) in the optional casing, where (unfiltered) water can be introduced into the assembly from the container. Optionally, once the water passes through the opening(s), it reaches the filter media receiving area, where it contacts the filter media disposed at least partially therein at the outer, curved surface, which can also comprise the beginning of the exemplary water flow path. The water is then filtered as it passes through the filter media. Upon exiting the filter media (e.g., from the inner curved surface), the water passes through the opening(s) in the internal frame and into the channel or cavity where it is dispensed through the upper opening in the frame and from the container (e.g., through a pour spout or other opening therein, which can restrict the flow of water therethrough such that a desirable retention time within the filter media is achieved).

Such a flow path can be termed or observed in a filter-as-you-pour system. Such systems do not require filtration through the filter assembly at the time the container is filled with water. In other words, the container can include a reservoir for receiving and/or holding unfiltered water (e.g., directly from an unfiltered or other water source, such as a water spout, tap, river, lake, rain, run-off, etc.). The container can, therefore, be devoid of separate filtered water and unfiltered water reservoirs, which together occupy and waste valuable space. Instead, water can be filtered on demand from the container and/or can be chilled prior to filtration and consumption.

An alternative (or additional) flow path runs the reverse course of the above. In other words, (unfiltered) water can enter the filter assembly (axially) via the upper opening in the filter housing and pass through the channel, through the opening(s) in the body and into the receiving area, where it contacts the filter media disposed at least partially therein at the inner, curved surface. The water is then filtered as it passes (laterally and/or radially) through the filter media. Upon exiting the filter media (e.g., axially and/or from the outer curved surface), the water passes through the opening(s) in the optional outer casing.

Such a flow path can be termed or observed in a filter-as-you-fill system. Such systems allow for filtration through the filter assembly at the time the container is filled with water. However, because of the increase in processing or filtering flow rates described herein, filter as you fill systems of the present disclosure can eliminate the need for unfiltered water reservoirs common in known filter devices. In other words, the container can include an opening for receiving unfiltered water (e.g., directly from an unfiltered or other water source, such as a water spout, tap, river, lake, rain, run-off, etc.) directly into the filter assembly. The increased flow rates possible with implementations of the present disclosure, therefore, allow for containers to be devoid of separate filtered water and unfiltered water reservoirs, which together occupy and waste valuable space. Instead, water can be filtered upon entry into the container and/or filtered on demand from the container as the water is poured. Water can also be chilled before and after filtration prior to consumption.

In an illustrative implementation, characteristics of filter media (textile) material can also be adjusted to alter the flow characteristics of the stream of water exiting the system (e.g., in combination with a flow control device disposed proximate the outlet of the container). For example, the filter media can comprise a single layer or a plurality of layers of the textile material. Thus, a second layer of filter media can be provided, so that the filter media comprises two layers of textile material (e.g., two layers, each about 0.75 mm to about 1 mm in thickness). In at least one implementation, similar results can be achieved by increasing the thickness of a single textile layer (e.g., about 1.5 mm to 2 mm rather than a 0.75 mm to 1 mm thick single layer). Providing two layers of filter media (textile) material (or a thicker single layer) can reduce the flow rate of water through the system as compared to a single layer of a given thickness.

Use of two layers can also increase the filtration effectiveness characteristics (e.g., a higher fraction of removed chlorine), or increase the life (e.g., gallons filtered before recommended filter replacement) of the filter media. For example, use of two layers may flatten the curve resulting from a plot of chlorine removal versus gallons filtered (see FIG. 15), providing increased consistency over the life of the filter in certain implementations. In addition, the second layer can be differently configured relative to the first layer, so as to remove different contaminants. For example, a second layer can comprise an ion exchange resin (IER) (e.g., in fibrous, felt, and/or other textile form), so as to be disposed within the filter assembly in a similar manner as the activated carbon textile material (i.e., within the receiving area). The IER can be adapted and/or configured for (or capable of) removing heavy or other metal contaminants (e.g., copper, cadmium, mercury, lead, etc.)). An illustrative example of an ion exchange textile (IET) material can be found under the trade name Poseidon fibre, manufactured by Kelheim Fibres, Germany.

In some implementations, the IET or fibrous IER can have or comprise a wet laid or needle-punched textile form or material (e.g., formed from base fibers that have been cast into a mat or other form). An alternative implementation can include a composite of more common beaded or fractured beaded IER (e.g., physically impregnated into or entwined in a textile substrate or adhered to a textile base with a binder).

In other illustrative implementations, the IER or other additional filter media can be maintained within the channel of the frame or body. Accordingly, a filter media retaining member can be secured to the top end of the channel to prevent loss of the internal filter media. Such filter media can be granular or otherwise configured in certain implementations.

Figure 1B:
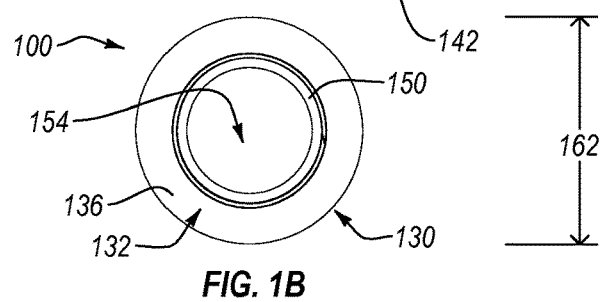
FIG. 1B illustrates a top plan view of the filter housing of FIG. 1A.
Figure 1C:
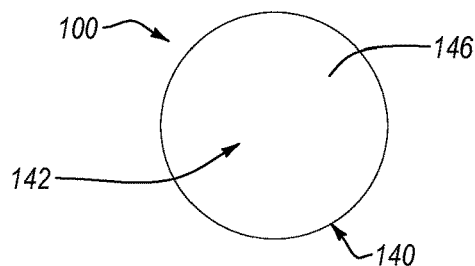
FIG. 1C illustrates a bottom plan view of the filter housing of FIG. 1A.

Turning now to the figures, FIGS. 1A-1C illustrates an exemplary filter housing 100 according to an implementation of the present disclosure. For example, FIG. 1A illustrates a facing view of filter housing 100. Filter housing 100 includes a casing 110 having a plurality of openings 112. Casing 110 can alternatively include a single opening 112. In some implementations, filter housing 100 can optionally include an inner frame (not shown) that defines or at least partially bounds a channel (not shown). Certain implementations of the present disclosure include a frame without an outer casing 110. In other implementations, casing 110 can provide both (internal and/or external) structure and the (internal) channel or cavity. Accordingly, the filter housing 100 can be operable to permit a fluid, such as water, to enter the filter housing 100 (and/or channel) laterally or radially through the one or more openings 112 in the (outer) covering or casing 110.

Filter housing 100 and/or casing 110 thereof can have a first or upper end and an opposing second or lower end. For instance, as illustrated in FIG. 1A, filter housing 100 has a first or upper end 130 and an opposing second or lower end 140 (e.g., separated by a length or height 160). The first or upper end 130 can comprise a capping member (i.e. cap) or flange 132 having a first or inner surface 134, a second or outer surface 136, and a circumferential outer edge 138. The first end 130 can also have an attachment mechanism 150 (e.g., extending from the second surface 136 and having a threaded member 152). First end 130, cap 132, and/or attachment mechanism 150 can have one or more openings 154. Thus, as illustrated in FIG. 1B, first end 130 can comprise an open configuration. Filter housing 100 can also have a width or diameter 162.

Returning now to FIG. 1A, the second or lower end 140 also comprises a cap or flange 142 having a first or inner surface 144, a second or outer surface 146, and a circumferential outer edge 148. As illustrated in FIG. 1C, second end 140 comprises a closed configuration. In at least one implementation, one or more elements of the filter housing can be reversibly attachable and/or removable. For instance, cap 132 and/or cap 142 can be or comprise a removable cap. Accordingly, cap 132 and/or cap 142 can also include an attachment mechanism. Furthermore, one will appreciate that, as used herein, a cap (e.g., cap 132, 142) need not have or comprise a closed configuration. For instance, cap 132 can and/or cap 142 can comprise and opening and/or open configuration in some implementations.

Figure 2:
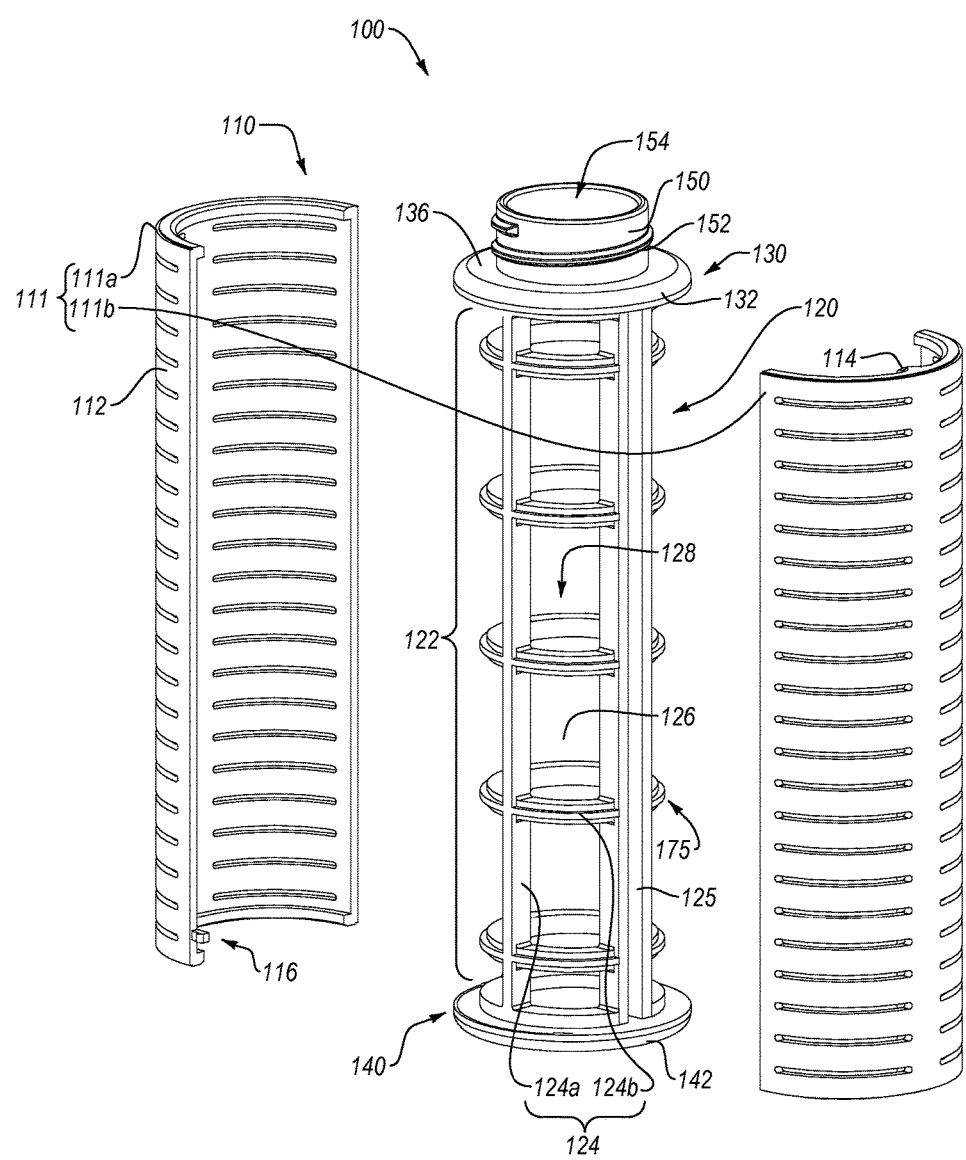
FIG. 2 illustrates an exploded perspective view of the filter housing of FIGS. 1A-1C.

FIG. 2 illustrates an exploded perspective view of filter housing 100 according to an implementation of the present disclosure. As illustrated in FIG. 2, filter housing 100 can comprise a frame or inner frame 120 and, optionally, an outer casing 110. In at least one implementation, first or upper end 130 and opposing second or lower end 140 of filter housing 100 can comprise, respectively, upper and lower ends of frame 120. Accordingly, frame 120 can have, include, comprise, or provide first or upper end 130 and/or opposing second or lower end 140.

Furthermore, the first end 130 of frame 120 can have, include, comprise, or provide cap or flange 132 and/or the attachment mechanism 150. For instance, FIG. 2 illustrates threaded member 152 of attachment mechanism 150, which extends from cap 132 of the first end 130 of the frame 120. Likewise, frame 120, first end 130 thereof, cap 132 thereof, and/or attachment mechanism 150 thereof can each have, include, comprise, or provide opening 154. Similarly, the second end 140 of frame 120 can have, include, comprise, or provide cap or flange 142. Thus, the first end 130, second end 140, cap or flange 132, cap or flange 142, and/or the attachment mechanism 150 of filter housing 100 can be or comprise element(s) of frame 120. One will appreciate, however, that one or more of such elements can be elements of the optional casing 110 or other portion of filter housing 100.

The second or lower end 140 of frame 120 can have or comprise a closed configuration in certain implementations. For instance, cap 142 is closed and/or has a closed configuration. One will appreciate, however, that an open configuration is also contemplated herein. Furthermore, caps 132, 142 can be removably or permanently secured to the frame 120 or can be integrally formed therewith (e.g., such that frame 120 comprises a unitary structure). For instance, caps 132, 142 can comprise selectively removable and attachable capping members. Thus, caps 132, 142 can comprise separate and discrete members from frame 120. Alternatively, caps 132, 142 can comprise a welded, irremovably affixed, and/or permanently secured capping members. In an alternative implementation, caps 132, 142 and frame 120 can be molded, connected, or formed together (e.g., as an integral, single, and/or unitary structure and/or integrally formed as a single piece).

Frame 120 can also include a body 122 (e.g., extending between the first or upper end 130 and the opposing second or lower end 140 of frame 120). Thus, body 122 can have or comprise first or upper end 130 and opposing second or lower end 140, corresponding to first or upper end 130 and opposing second or lower end 140 of frame 120. Body 122 can also comprise a framework and/or one or more support members 124. Body 122 can also comprise one or more openings 126. For instance, as illustrated in FIG. 2, the body 122 includes a plurality of axial support members 124a extending between the first end 130 and the opposing second end 140, a plurality of circumferential support members 124b extending between the plurality of axial support members 124a, and a plurality of openings 126 between support members 124. In alternative implementations, however, one or more support members 124 can have or comprise various configurations. For instance, body 122 can comprise a single axial support member and a single opening 126. Alternatively, body 122 can comprise a plurality of axial support members 124a, a single circumferential support member 124b, and a plurality of openings 126. Indeed, any suitable combination of one or more support members 124 and/or openings 126 is contemplated herein.

Certain implementations of frame 120 can include a slot configured to receive a portion of a filter media (e.g., in a receiving area or space 175 (e.g., between at least a portion of frame 120 and at least a portion of the optional casing 110)). For instance, FIG. 2 illustrates slot 125 extending between the first and second ends 130, 140. Slot 125 can extend the entire length or a portion of the length between cap 132 and cap 142. Slot 125 can comprise an indentation in body 122 or a space or opening between two axial support members 124a. Other configurations of slots are also contemplated herein.

In some implementations, the frame 120, body 122, and/or support member(s) 124 at least partially bound a channel 128 (e.g., disposed at least partially within the body 122 and/or extending at least partially between the first and second ends 134, 140). As illustrated in FIG. 2, for instance, the channel 128 can comprises a cavity, void, conduit, passage, or other substantially hollow space (e.g., that begins at opening 154 of frame 120, first end 130, cap 132, and/or attachment mechanism 150 and terminates at second end 140 and/or cap 142). In addition, the one or more openings 126 can be in fluid communication with the channel 128. Furthermore, frame 120 (and body 122 thereof) can comprise a substantially tubular, cylindrical configuration with support members 124 at least partially bounding and/or defining the tubular, cylindrical channel 128.

In some implementations, casing 110 can comprise one or more casing members 111. For instance, FIG. 2 also illustrates casing members 111a, 111b configured to be (removably) secured about the frame 120 via an attachment mechanism 116 to form outer casing 110 (see FIG. 1A). Attachment mechanism 116 can comprise a clip, snap, lock-and-key, or other fastener(s). Casing members 111 can also be configured to at least partially cover at least a portion of the body 122 (e.g., while maintaining a space between at least a portion of the casing members 111 and at least a portion of the frame 120 and/or body 122). In at least one implementation, the space can comprise a receiving area 175 (e.g., for receiving a filter media therein).

One will appreciate, however, that the present disclosure is not limited to two casing members 111 connected of joined about frame 120. For instance, casing 110 can comprise more than two casing members 111. In at least one alternative implementation, casing 110 can comprise a single, continuous, unitary, tubular, and/or cylindrical sleeve configured to slide or be slid into position about at least a portion of frame 120 (e.g., and a filter media positioned about frame 120). In at least one alternative implementation, the casing 110 can be integral with or attached to the frame 120 (e.g., such that a filter media must be inserted between frame 120 and casing 110).

The casing members 111 can comprise a plurality of openings 112 configured to be in fluid communication with the channel 128 via the one or more openings 126 in the body 122. When assembled, the one or more openings 112 in the casing 110 or casing members 111, the space between at least a portion of the casing 110 or casing members 111 and at least a portion of the frame 120, the one or more openings in the body 126, the channel 128, and/or the aperture or opening 154 form or comprise a fluid flow path (not shown).

In certain implementations, one or more casing member 111 can also include a notch 114. For instance, casing member 111b has a notch 114 extending along the inner surface thereof. Notch 114 can be aligned with slot 125, for instance, and/or can be configured to secure at least a portion of a filter media to, in, or within slot 125. Notch 114 can also align and/or secure casing member 111b to or about the frame 120.

Figure 3:
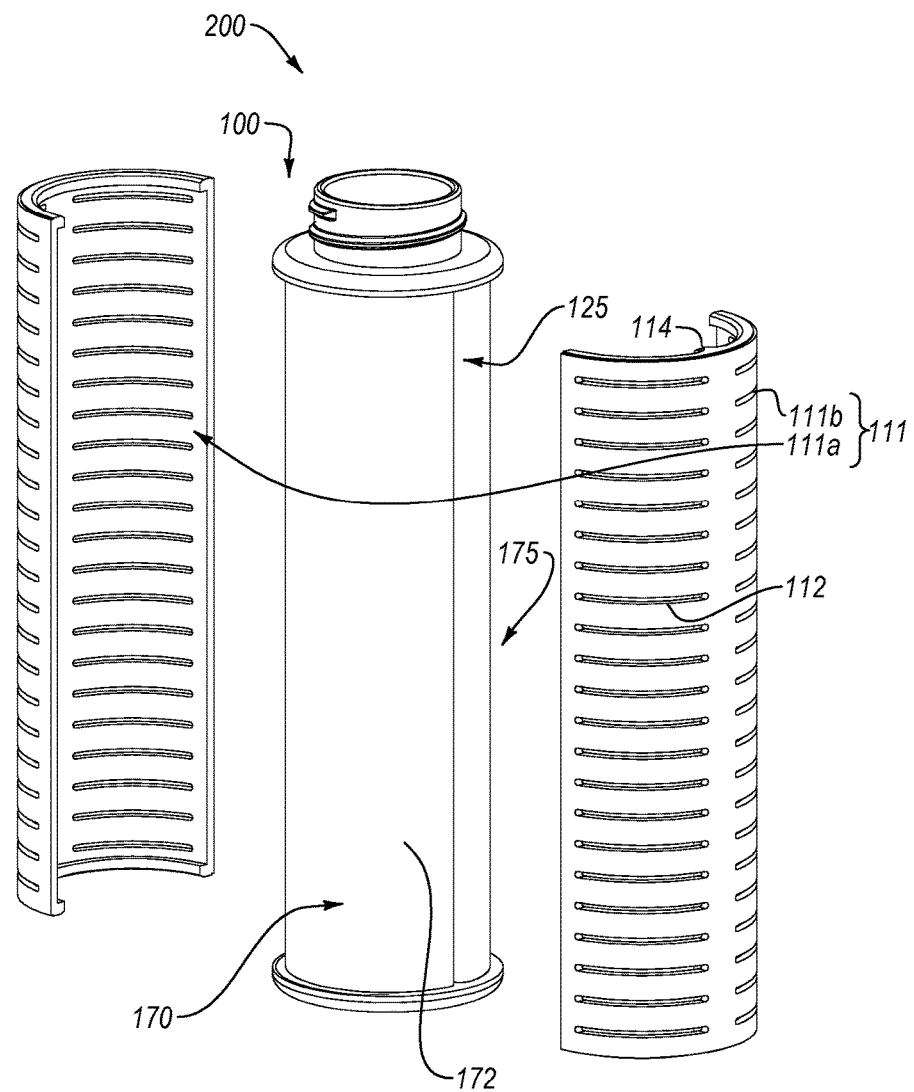
FIG. 3 illustrates an exploded perspective view of an exemplary filter assembly according to an implementation of the present disclosure.

FIG. 3 illustrates an exploded perspective view of an exemplary filter assembly 200 according to an implementation of the present disclosure. The filter assembly 200, according to the illustrated implementation, can be formed of the filter housing 100 and a filter media 170. As illustrated in FIG. 3, filter housing 100 can comprise a frame 120 and an optional casing 110. Filter housing 100 (or portion thereof) can be configured to receive the filter media 170 (e.g., in the space or receiving area 175). In at least one implementation, a fluid passing through the receiving area 175, filter fluid flow path (not shown), or between the one or more openings 112 in the casing 110 and the one or more openings in the body (not shown) is filtered by the filter media 170. Furthermore, a portion of the filter media 170 can be positioned in slot 125 of frame 120. For instance, first and second (terminal) ends of filter media 170 can be inserted into slot 125 (e.g., such that notch 114 of optional casing 110 can more fully secure a portion of the filter media 170 within the slot 125).

FIG. 3 further illustrates that at least a portion of the filter media 170 is maintained in a curved configuration in the space 175 such that at least a portion of the filter media 170 presents a curved surface 172 (e.g., to a fluid in the filter flow path). In the substantially cylindrical example illustrated in FIG. 3, the curved surface 172 of filter media 170 substantially surrounds or covers the body of the frame. In at least one implementation, the filter assembly 200 is operable to filter fluid at a rate between about 0.3 GPM and about 2.0 GPM, between about 0.3 GPM and about 1.0 GPM, or between about 0.5 GPM and about 0.8 GPM when filter media 170 is positioned and/or maintained in the curved configuration in the space or receiving area 175. Filter assembly 200 can also be operable to filter fluid at a rate of at least about 0.3 gallons per minute (GPM), at least about 0.4 GPM, at least about 0.5 GPM, at least about 0.6 GPM, at least about 0.7 GPM, at least about 0.75 GPM, at least about 0.8 GPM, at least about 0.85 GPM, at least about 0.9 GPM, at least about 0.95 GPM, at least about 1.0 GPM, at least about 1.5 GPM, or at least about 2.0 GPM, and/or any value or range of values included therein, when the filter media 170 is positioned and/or maintained in the curved configuration in the space or receiving area 175.

Figures 4A, 4B:
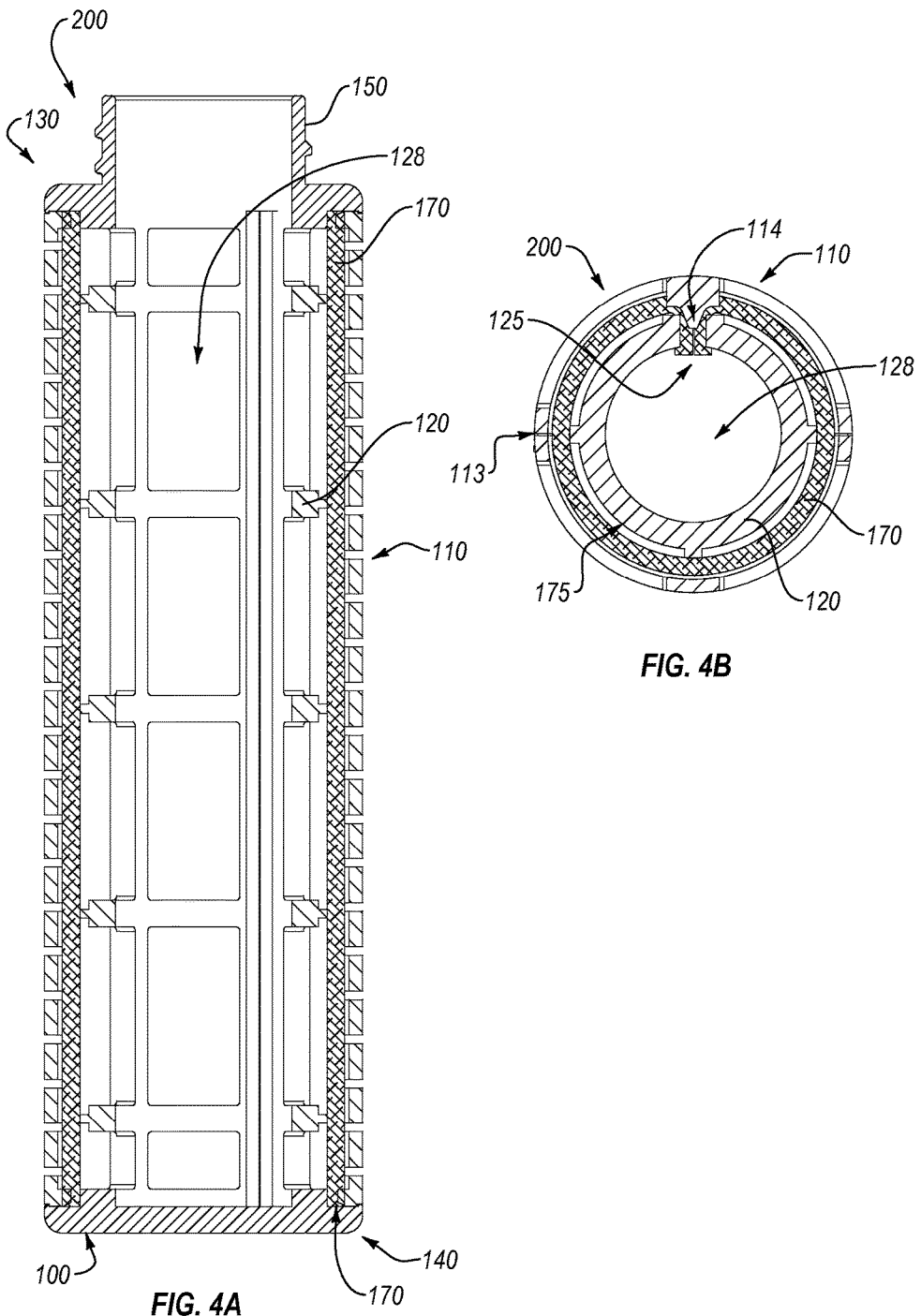
FIG. 4A illustrates a front cross-sectional view of the filter assembly of FIG. 3.
FIG. 4B illustrates a top cross-sectional view of the filter assembly of FIG. 3.

FIG. 4A illustrates a side cross sectional view of filter assembly 200. As illustrated in FIG. 4A, filter media 170 is positioned, secured, and/or maintained within receiving area 175 (i.e., sandwiched between frame 120 and casing 110). Frame 120 can at least partially bound channel 128, which can extend between first end 130 and second end 140. Attachment mechanism 150 can extend upward from first or upper end 130, each of which has a substantially open configuration such that fluid can flow therethrough. Second or lower end 140, on the other hand, can have a closed configuration to limit, inhibit, or prevent fluid from flowing therethrough. In an alternative implementation, second or lower end 140 can have an at least partially open configuration. For instance, filter media 170 can at least partially cover, surround, and/or wrap around an open second end 140. In such a configuration, the fluid flow path can include one or more openings (not shown) in the second or lower end 140.

In one or more implementations, a filter assembly can be designed to filter substantially all of the water or other fluid passing through the filter flow path. In other words, some implementations can substantially preclude passage of unfiltered water through the filter assembly (e.g., through an opening that is not associated with or in fluid communication with the filter media. For example, certain implementations of the present disclosure can (or can be designed to) prevent or inhibit water from entering and exiting the filter assembly without passing through the filter media. Those of skill in the art will appreciate that such a design can be accomplished in a variety of ways, all of which are contemplated herein.

FIG. 4B illustrates a top cross-sectional view of filter assembly 200. Filter assembly 200 can have an outer casing 110 including a plurality of outer casing members connected or joined at an interface 113. As illustrated in FIG. 4B, inner frame 120 (or a portion thereof) can comprise a substantially tubular and/or cylindrical configuration at least partially bounding channel 128. Accordingly, when filter media 170 is secured between at least a portion of the frame 120 and the casing 110 (e.g., in the space or receiving area 175), filter media 170 can be secured, held, retained, maintained, or positioned in a substantially tubular and/or cylindrical configuration. A portion of filter media 170 can be inserted, slid, or otherwise positioned within slot 125 in frame 120. Furthermore, notch 114 in casing 110 (or casing member thereof) can at least partially align and/or associate with slot 125 and/or secure a portion of filter media 170 therein. The curved configuration of filter media 170 can, in certain implementations, allow, provide, and/or permit the faster flow rates described herein.

Figure 5A:
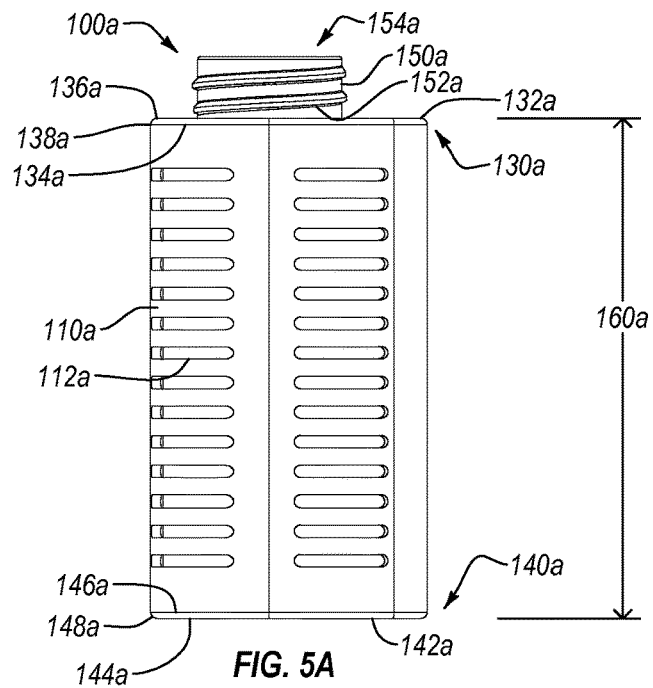
FIG. 5A illustrates a facing view of another exemplary filter housing according to an implementation of the present disclosure.
Figure 5B:
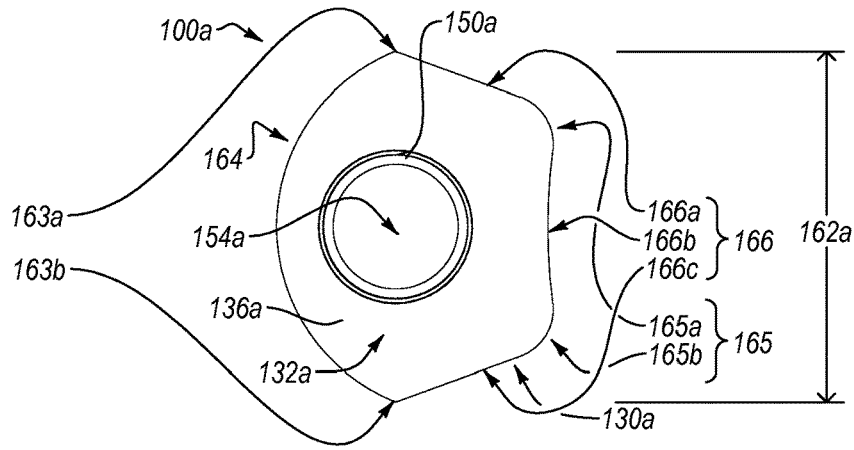
FIG. 5B illustrates a top plan view of the filter housing of FIG. 5A.

FIGS. 5A-5B illustrates an alternative implementation of the present disclosure in which a filter housing 100a comprises a partially cylindrical configuration. As illustrated in FIG. 5A, filter housing 100a includes an optional covering or casing 110a extending between a first end 130a and an opposing second end 140a. Casing 110a can have a plurality of openings 112a between first end 130a and second end 140a and an attachment mechanism 150a, which includes a threaded attachment element 152a and opening or aperture 154a.

FIG. 5B further illustrates the partially cylindrical configuration of filter housing 100a. For instance, at least a first face or first portion 164 of filter housing 100a has a substantially cylindrical or curved configuration. At least a second face or second portion 166 of housing 100a, however, has a non-cylindrical, non-curved, or flat configuration. One will appreciate that curved and/or angled transitions between one or more first faces or first portions 164 and/or one or more second faces or second portions 166 is also contemplated herein. FIG. 5B, for instance, illustrates angled transitions 163a and 163b between curved face 164 and substantially flat faces 166a and 166c, respectively. Furthermore, FIG. 5B illustrates curved transitions 165a and 165b between substantially flat faces 166a, 166b, and 166c, respectively. One will appreciate, however, that any suitable combination of faces, curved and/or substantially flat, with any suitable combination of transitions, angled and/or curved, are contemplated herein.

Figure 5C:
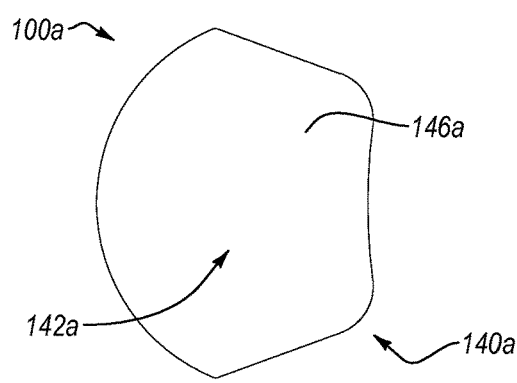
FIG. 5C illustrates a bottom plan view of the filter housing of FIG. 5A.

FIG. 5C illustrates a bottom plan view of the filter housing 100a. In particular, FIG. 5C illustrates the closed configuration of the second end 140a of filter housing 100a.

Figure 6:
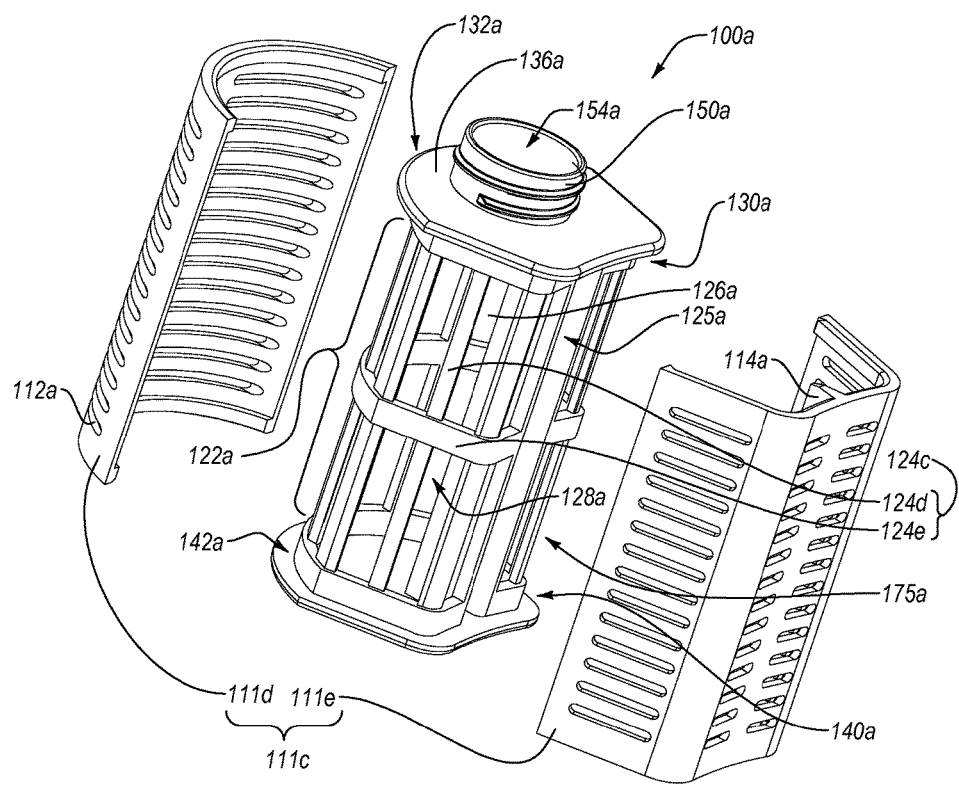
FIG. 6 illustrates an exploded perspective view of the filter housing FIGS. 5A-5C.

FIG. 6 illustrates an exploded view of filter housing 100a including optional casing 110a (comprising or comprised of one or more casing members 111) and a frame 120a. In certain implementations, frame 120a has or provides the first or upper end 130a and/or the second or lower opposing end 140a. Upper end 130a can have a cap 132a and lower end 140a can have a cap 142a. Frame 120a can also have a body 122a extending between first end 130a and second end 140a. Body 122a can have, include, or comprise one or more support members 124c and/or one or more openings 126a. Support members 124c can include one or more axial support members 124d (e.g., extending at least partially between first end 130a and second end 140a), and/or one or more circumferential support members 124e (e.g., encircling or extending about the body 122a of frame 120a). Circumferential support members 124e can extend around, between, within, or through axial support members 124d in certain implementations.

Frame 120a, body 122a, and/or support member(s) 124c can at least partially bound channel 128a (e.g., disposed at least partially therein), which can extend at least partially between first end 130a and second end 140a. Opening(s) 112a in casing 110a (and/or casing member 111 thereof) and/or opening(s) 126a in frame 120a can be in fluid communication with channel 128a. Frame 120a can also have or provide the opening 154a in the upper end 130a and/or attachment mechanism 150a thereof. Frame 120a can also have one or more slots 125a. For instance, frame 120a has a slot 125a between two axial support members 124d and extending between first end 130a and second end 140a.

Casing 110a can include, comprise, or be comprised of one or more casing members 111. For instance, casing 110a has curved or substantially cylindrical casing member 111d and angular or non-cylindrical casing member 111e. One or more of the casing members 111 can comprise one or more openings 112a. For instance, each of casing members 111d and 111e has a plurality of openings 112a. One or more of the casing members 111 can comprise one or more notches 114a. For instance, casing member 111e has a notch 114a extending along the inner surface thereof. Notch 114a can be aligned with slot 125a, for instance, and/or can be configured to secure at least a portion of a filter media to, in, or within slot 125a. Notch 114a can also align and/or secure at least casing member 111e to or about the frame 120a.

Figure 7:
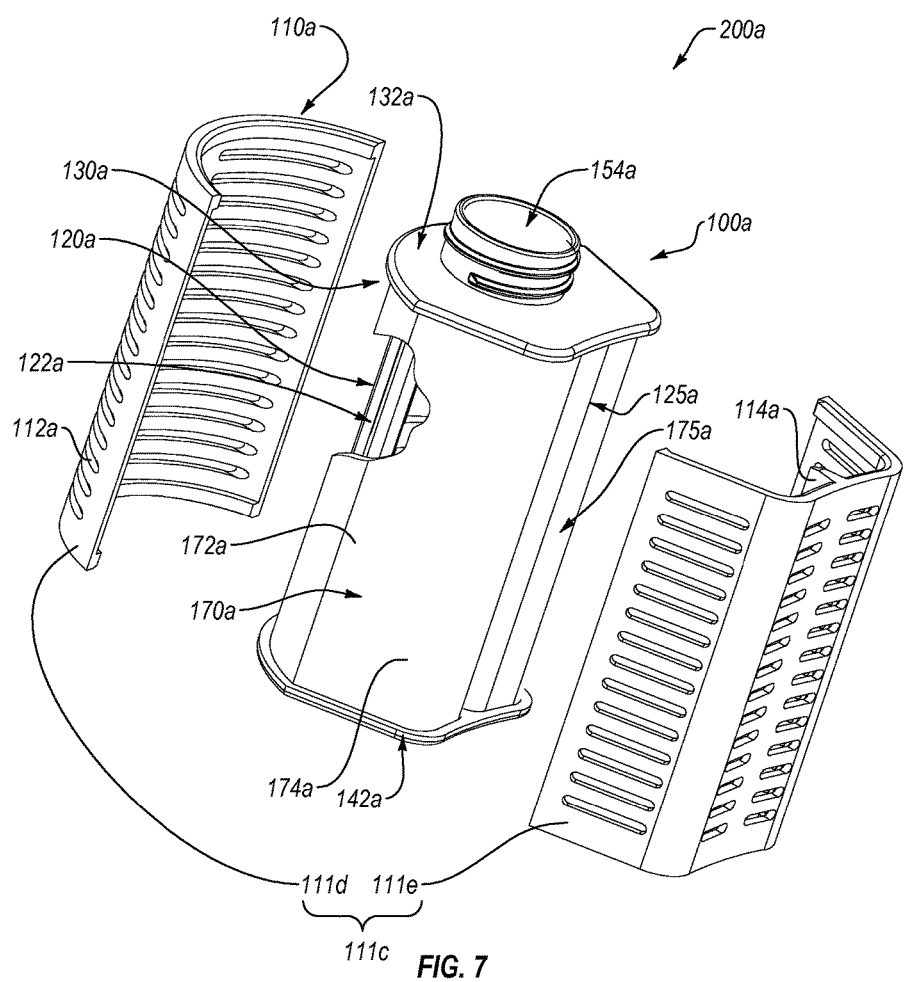
FIG. 7 illustrates an exploded perspective view of another exemplary filter assembly according to an implementation of the present disclosure.

FIG. 7 illustrates an exploded view of a filter assembly 200a comprising filter housing 100a and a filter media 170a. As illustrated in FIG. 7, the filter housing 100a or frame 120a thereof can be configured to receive filter media 170a (e.g., in the space or receiving area 175a. In at least one implementation, receiving area 175a can comprise a space between at least a portion of the optional casing 110a or casing member(s) 111 and at least a portion of the frame 120a and/or body 122a thereof). Alternatively, receiving area 175a can comprise a portion of the frame 120a and/or body 122a thereof.

In at least one implementation, a fluid passing through the receiving area 175a can be filtered by the filter media 170a. Furthermore, a portion of the filter media 170a can be positioned in slot 125a. For instance, first and second (terminal) ends of filter media 170a can be slid or inserted into slot 125a (e.g., such that notch 114a of casing 110a (or casing member 111e thereof) can further secure a portion of the filter media 170a within the slot 125a.

FIG. 7 further illustrates that at least a portion of the filter media 170a can be maintained in a curved configuration (e.g., in the space 175a) such that at least a portion of the filter media 170a presents a curved surface 172a (e.g., to a fluid in the filter flow path). Angular or non-cylindrical casing member 111e (corresponding in shape to an angular or non-cylindrical side of frame 120a) can likewise maintain filter media 170a in an angled configuration in the corresponding portion of space 175a. In at least one implementation, filter assembly 200a is operable to filter the fluid at a rate between about 0.3 GPM and about 2.0 GPM, between about 0.3 GPM and about 1.0 GPM, or between about 0.5 GPM and about 0.8 GPM (e.g., through the curved or cylindrical portion(s) thereof) when the filter media 170a is positioned and/or maintained in an at least partially curved configuration in the space or receiving area 175a. Filter assembly 200a can also be operable to filter fluid at a rate of at least about 0.3 gallons per minute (GPM), at least about 0.4 GPM, at least about 0.5 GPM, at least about 0.6 GPM, at least about 0.7 GPM, at least about 0.75 GPM, at least about 0.8 GPM, at least about 0.85 GPM, at least about 0.9 GPM, at least about 0.95 GPM, at least about 1.0 GPM, at least about 1.5 GPM, or at least about 2.0 GPM, and/or any value or range of values included therein, when the filter media 170 is positioned and/or maintained in the at least partially curved configuration in the space or receiving area 175a.

Figure 8:
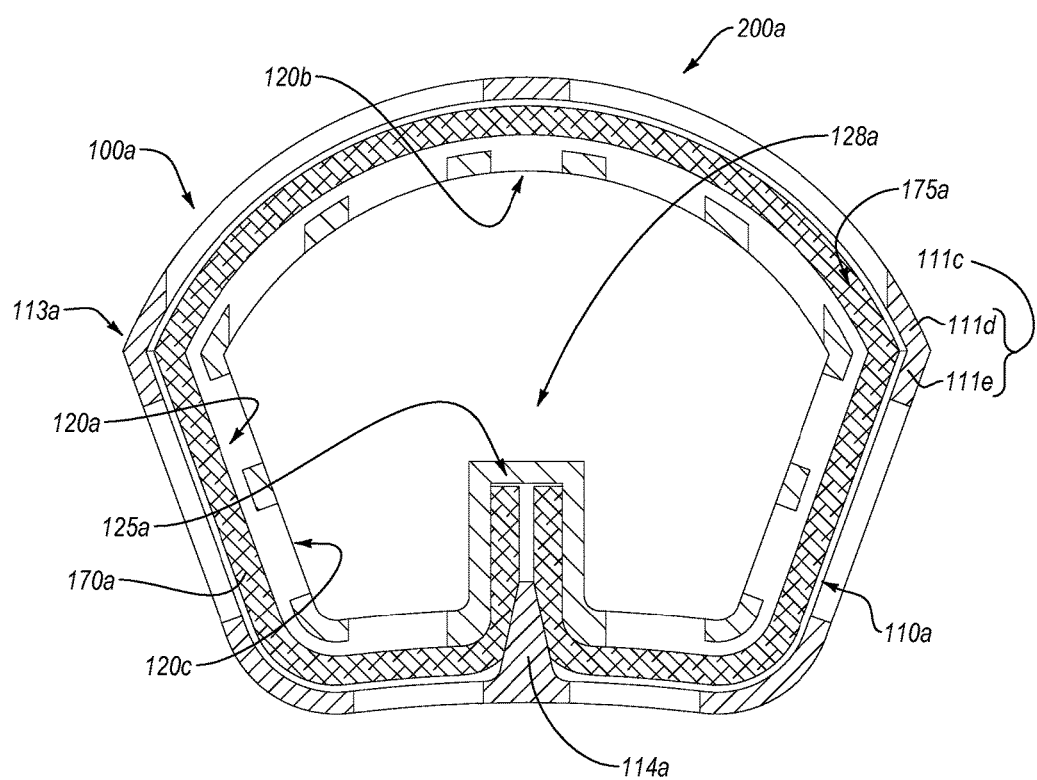
FIG. 8 illustrates a top cross-sectional view of the filter assembly of FIG. 7.

FIG. 8 illustrates a top cross-sectional view of filter assembly 200a. As illustrated in FIG. 8, frame 120a (or a portion thereof) can comprise a substantially tubular configuration at least partially bounding channel 128a. Specifically, frame 120a has a curved or substantially cylindrical portion 120c and an angled or non-cylindrical portion 120c. Likewise, optional casing 110a can comprise or be comprised of curved or substantially cylindrical casing member 111d and an angled or non-cylindrical casing member 111e (e.g., connected or joined at an interface 113a). Accordingly, when filter media 170a is secured (or sandwiched) between at least a portion of the frame 120a and casing 110a (e.g., in the space or receiving area 175a), filter media 170a can be secured, held, retained, maintained, or positioned in a substantially tubular configuration having both an at least partially curved configuration and an at least partially angled configuration.

At least a portion of filter media 170a can be wrapped around, inserted into, slid about, or otherwise positioned within slot 125a in frame 120a. Furthermore, notch 114a in optional casing 110a (or casing member 111 thereof) can at least partially align and/or associate with slot 125a and/or more fully secure a portion of filter media 170a therein. The curved configuration of filter media 170a can, in certain implementations, allow, provide, and/or permit the faster flow rates described herein.

Figure 9:
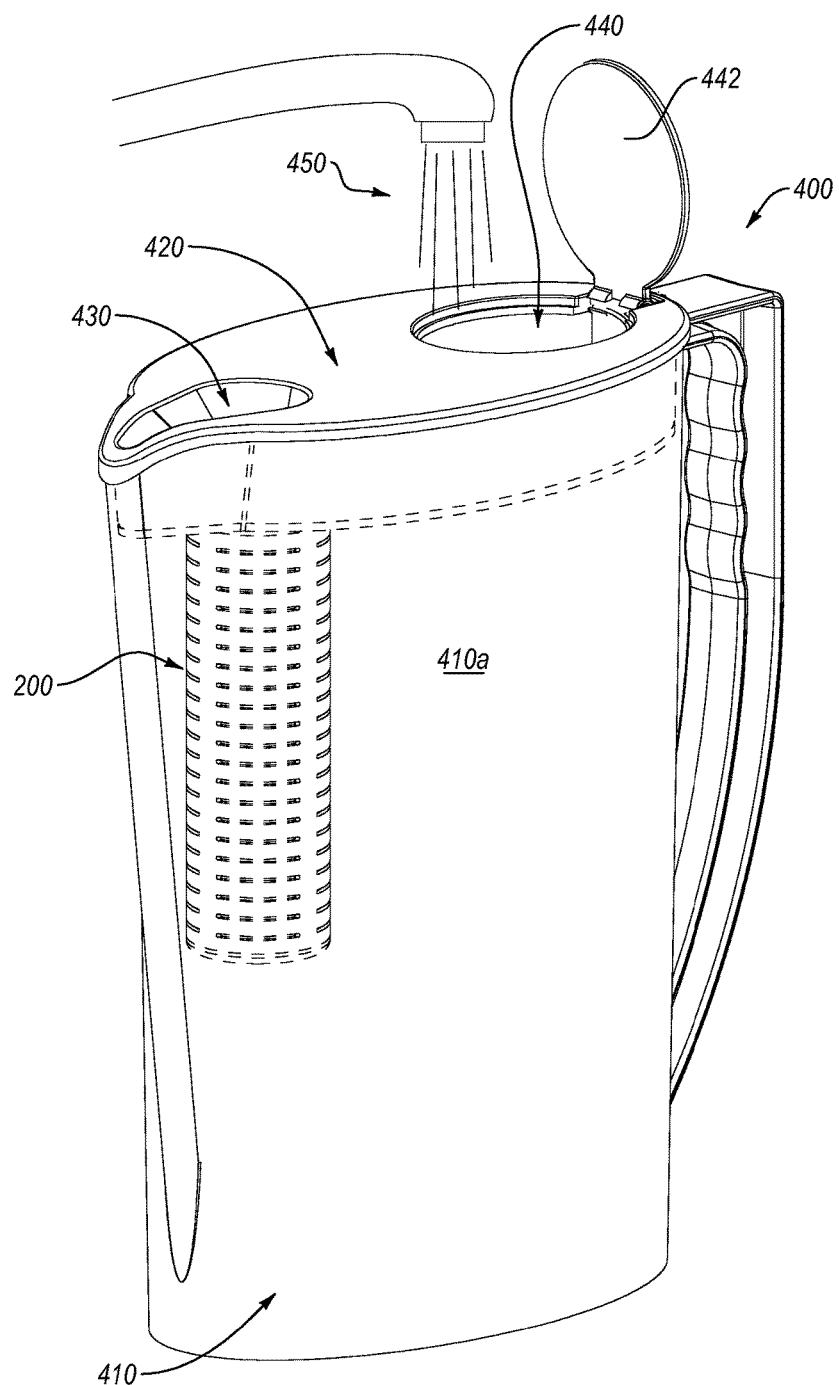
FIG. 9 illustrates a schematic view of an exemplary filter device in a filter-as-you-pour system according to an implementation of the present disclosure.

FIG. 9 illustrates a filter device or pitcher 400 having filter assembly 200 installed therein. Filter assembly 200 can be reversibly and/or removably attached or connected, for example, to lid 420 at or near pour spout or opening 430. In some implementations, opening 430 can be in fluid communication with channel 128 via opening 154 (see e.g., FIG. 2). Pitcher 400 also has a container body or receptacle 410 with a storage volume or reservoir 410a and a fill opening 440 for filling reservoir 410a with unfiltered water. Fill opening 440 can be covered by a fill lid 442. FIG. 9 further illustrates an exemplary filling method for a filter-as-you-pour system, method, mechanism. For instance, in at least one implementation, fluid 450 can enter container body 410 of pitcher 400 without being filter upon entry.

Figure 10:
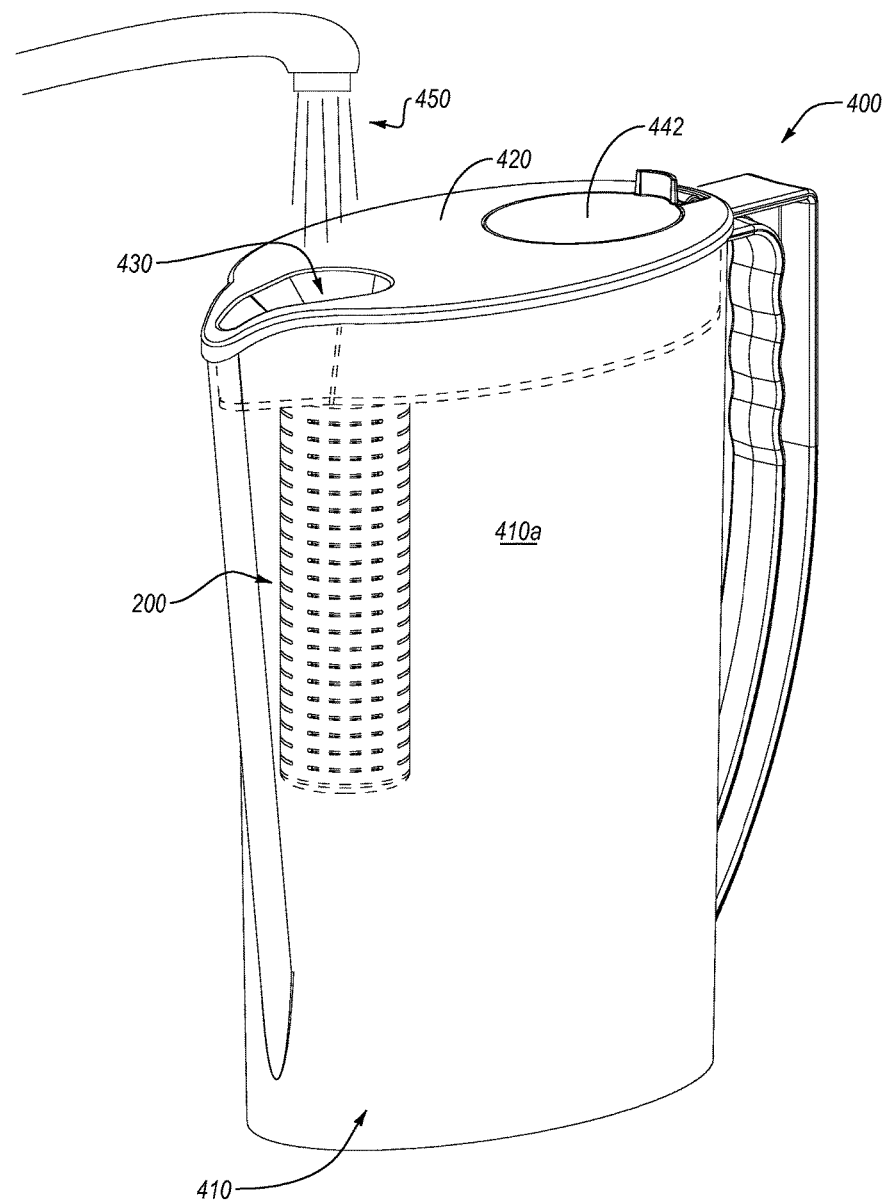
FIG. 10 illustrates a schematic view of the filter device of FIG. 9 in a filter-as-you-fill system according to an implementation of the present disclosure.

FIG. 10 illustrates an alternative method of filling pitcher 400 (i.e., via pour spout 430). One will appreciate that filling pitcher 400 via pour spout 430 can, in certain implementations, allow, permit, or constitute a filter-as-you-fill method or system. Thus, water or other fluid can be filtered by filter assembly 200 as it enters the pitcher 400 before entering reservoir 410a, as illustrated in FIG. 10, or can enter filter device 400 unfiltered via fill opening 440, as illustrated in FIG. 9.

One will further appreciate that the terms "filtered" and "unfiltered," as used herein are relative to the filtration performed in implementations of the present disclosure (e.g., filter media and filter assemblies). Thus, previously filtered (e.g., by an external source of filtration) water or other fluids can still be deemed unfiltered in certain implementations of the present disclosure (e.g., if such a fluid has not yet passed through a filter media or assembly of the present disclosure).

Figure 11:
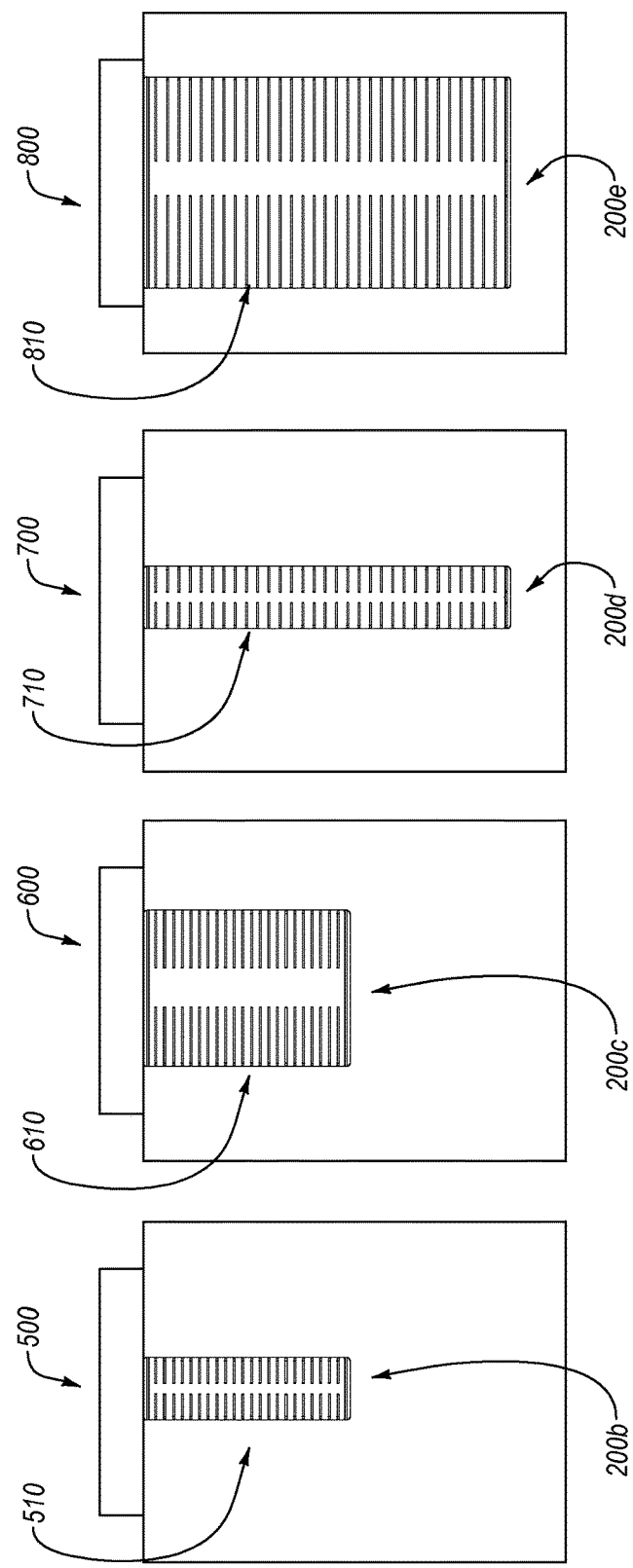
FIG. 11 illustrates a schematic views of a variety of exemplary filter devices each incorporating a filter assembly according to an implementation of the present disclosure.

FIG. 11 illustrates schematic representations of four exemplary filter systems, each comprising a different size and/or configuration of a filter assembly. For instance, system 500 includes a filter assembly 200b connected to filter device 510. Filter assembly 200c of system 600 is approximately three times as wide as assembly 200b, while maintaining approximately the same height as assembly 200b. Filter assembly 200d, on the other hand, maintains approximately the same width as assembly 200b, but is approximately twice as long as assembly 200b. Filter assembly 200e of system 800 is approximately twice as long as assembly 200b and is approximately 5-6 times as wide as assembly 200b.

One will thus appreciate that filter assemblies can comprise any suitable dimension or configuration compatible with filter or filtration systems. In at least one implementation, the filter assembly is longer than it is wide. Without being bound to theory, it is anticipated that the greatest filtration efficiency can be achieved by optimizing the length and width of the filter assembly. For instance, in certain implementations, relatively long and thin filter assemblies can filter water or other fluid faster and more efficiently than relatively short and fat/wide filter assemblies.

Figure 12:
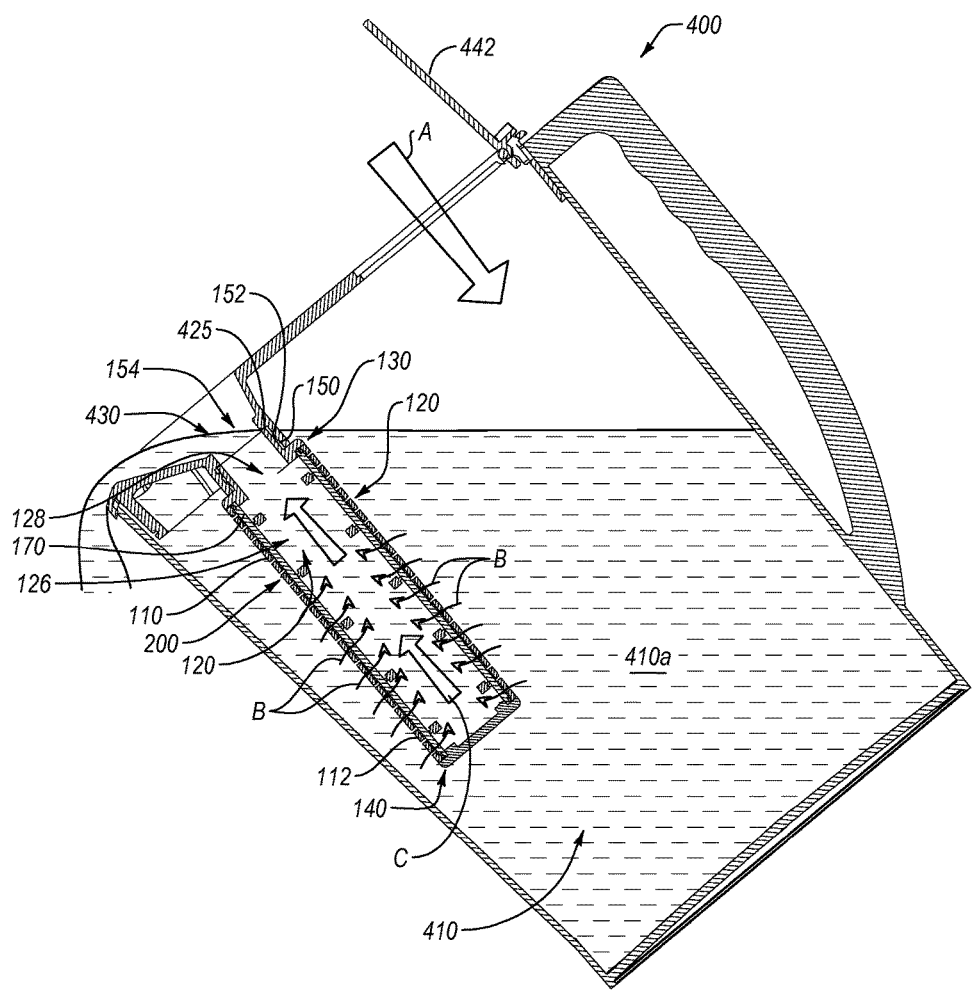
FIG. 12 illustrates a schematic cross-sectional view of the filter device of FIGS. 9-10 illustrating a fluid flow path according to an implementation of the present disclosure.

FIG. 12 illustrates a schematic cross-sectional view through pitcher, container, system, or filter device 400. FIG. 12 further illustrates an exemplary flow path (e.g., arrows A, B, and C) through which water can pass as it moves through an illustrative system that includes pitcher or container 400.

For example, water can be introduced into container 400 through inlet or fill opening 440 in lid 420 (e.g., with fill lid 442 open), as depicted by arrow A. In certain implementations, and as illustrated, no filter is be disposed between inlet 440 and storage volume or reservoir 410a, so that unfiltered water can be quickly introduced into container body or receptacle 410, without any delay associated with a filter disposed between inlet 440 and storage volume 410a. Thus, rather than filtering upon entering container body 410, at least some implementations of the present disclosure provide for filtering of the water (only) as it exits through outlet 430 of container 400. Of course, some implementations can provide filtering upon entrance and exit, if desired (e.g., through pour spout or opening 430, where the inlet and the outlet are one and the same).

When tipping pitcher 400 or container body 410 (e.g., as depicted in FIG. 13), the water can flow along a lateral or radial flow path, represented by arrows B, through one or more outer openings 112 in the casing 110. The fluid can then pass through the one or more layers of textile filter media 170, at least a portion of which is disposed so as to present a curved, rather than perpendicular or planar surface to the stream of water, and through the one or more openings 126 in the frame 120, into the channel or cavity 128. By positioning filter media 170 so that at least a portion thereof presents a curved, rather than planar surface, the inventors have surprisingly found that flow rates through the filter media are significantly increased. Once the water passes through the layer(s) of filter media 170, the filtered water can then flow axially, as represented by arrows C, through channel 128 towards and eventually out of the outlet or pour spout 430. The filtered water can optionally pass through a flow control device (not shown; e.g., a slit valve, grating, etc.), and out of lid 420.

Furthermore, filtration environments other than pourable pitchers or containers are also contemplated herein. For instance, certain implementations of the present disclosure can be configured for usage in squeezable or squirtable water bottles, whole home filtration systems, emergency water filtration devices, or even as stand-alone water filter assemblies. In an illustrative implementation, a filter assembly of the present disclosure can be placed into a moving or still body of water (e.g., river, stream, lake, swimming pool, etc.) to allow for filtration of the water thereof. For example, a filter assembly placed in the path of a river or in a standing body of water can filter water as it passes through the filter flow path, through the filter media, and into the channel or cavity of the filter assembly or frame thereof. Water in the channel can then be consumed by first lifting the filter assembly or device out of the water and allowing the water to drain into a drinking container. Alternatively, water in the channel can then be consumed by drinking directly from the filter assembly (or device) or by means of a straw of other implement. Thus, a variety of applications of the present disclosure are contemplated herein, including equivalents of the examples disclosed herein.

FIGS. 13A-13C illustrates an exemplary filter media 170 according to one or more implementations of the present disclosure. For instance, as illustrated in FIG. 13A, filter media 170 can comprise a non-particulate, non-granular, non-block, fibrous activated carbon textile material (with or without granular and/or particulate carbon entwined and/or impregnated therein. As illustrated in FIGS. 13B-13C, the fibers of the textile material can be matted together without being ordered in a consistent or other pattern. Those skilled in the art will appreciate that ordered (e.g., woven) configurations are also contemplated herein.

Surprisingly, the filter media 170 of certain implementations of the present disclosure (e.g., non-particulate, non-granular, non-block, fibrous, activated carbon textile material) can filter water or other fluids at a higher flow rate in a curved configuration than in a flat or planar configuration. For instance, when configured or maintained in a curved and/or cylindrical configuration, some filter media 170 of the present disclosure can filter water or other fluid at a rate of about 0.3 GPM to about 2.0 GPM while still achieving acceptable levels of filtration and/or purification.

Depending upon the size and density of the filter media and/or fibers, thickness and number of layers of the filter media and/or fibers, and/or other factors known to those skilled in the art (e.g., surface area, depth or thickness, contact surface area, and/or ratio between two or more factors), the fluid processing rate (or flow rate) through the filter media can be optimized to achieve a desired level of filtration or purification at one or more (or range of) desired flow rates (e.g., in the least amount of time possible). For instance, certain implementations of the present disclosure utilizing a curved, substantially curved, or partially curved filter media configured to filter between 0.3 GPM and 2.0 GPM of water or other fluid and remove approximately 50-100% of free chlorine in the fluid. One will appreciate that free chlorine (or other contaminant, molecule, compound, particle, etc.) removal target range(s) can also vary by material, material surface area, and/or depth. One will also appreciate that the removal target range(s) of other contaminants, molecules, compounds, particles, etc., can vary based on type.

Similarly, one or more of the foregoing factors and/or ratio(s) can be optimized to reduce the amount of filter media material required to achieve a desired level of performance (e.g., percent contaminant removal at a defined flow rate or range thereof). For instance, implementations of the present invention can require less space or volume of or inside a container or pitcher than can other systems having comparable performance levels. Thus, some implementations can provide a space, time, and/or cost savings over existing systems. Other implementations can provide increased levels contaminant removal at flow rates or speeds and/or filter assembly sizes comparable to existing systems. Other implementations can provide increased flow rates or speeds at and levels of contaminant removal and/or filter assembly sizes comparable to existing systems.

In at least one implementation, a filter-as-you-pour system of the present disclosure can provide contaminant removal target range(s) comparable to existing (filter-as-you-fill) systems, but at higher flow rate(s). In at least some implementations, this contaminant reduction percent can typically be anywhere from 50% to 90% or more over the life of testing. Those skilled in the art will appreciate that while contaminant removal target range(s) can change over the life of a filter system or filter media included therein, that one or more implementations of the present disclosure can provide comparable contaminant removal target range(s) at higher flow rate(s) at (each of) a variety of relative time points within or throughout the life-span thereof. For instance, in at least one implementation, a filter-as-you-pour system of the present disclosure can provide a single pass purification, contaminant removal target range, and/or contaminant reduction percent for 1 gallon (or a first gallon) of water at a maximum flow rate of 0.3 GPM to 2.0 GPM, while an existing (filter-as-you-fill or other) system may only provide the same at a maximum flow rate of 0.03 GPM to 0.09 GPM.

As indicated above, the contaminant (e.g., chlorine) removal target range(s) and/or contaminant reduction percent achieved by a single purification pass through a filter assembly or filter media thereof can change over the life of filter (media). For example, in at least one implementation, a single pass purification of 1 gallon (or a first gallon) of water (e.g., at a maximum flow rate of 0.70 GPM) through the filter (media) can remove up to, at least, greater than, or about 90% of free chlorine contaminant in the water. A single pass purification of 5 gallons (or a fifth gallon) of water (e.g., at a maximum flow rate of 0.70 GPM) through the filter (media) can remove up to, at least, greater than, or about 85% of free chlorine contaminant in the water. Similar reductions in the contaminant removal target range(s) and/or contaminant reduction percent achieved by a single purification pass through a filter assembly or filter media can occur as the processing or processed volume or amount increases. In at least one implementation, single pass purification of 40 gallons (or a fortieth gallon) of water (e.g., at a maximum flow rate of 0.70 GPM) through the filter (media) can remove up to, at least, greater than, or about 50% of free chlorine contaminant in the water.

Furthermore, without being bound to theory, faster flow rates are known to lower the contaminant reduction percent at each pass (or each of the pulls). For instance, the difference or decrease in contaminant reduction percent between 5 gallons pulled at 0.70 GPM and 5 gallon pulled at 1 GPM can be about 6-8% in some implementations. One will appreciate that the term "pull" is not intended to imply the exertion of a force (e.g., vacuum, pressure, squeezing, etc.). Thus, implementations of the present disclosure can pull water or other fluid through the filter assembly or filter media thereof under the force of gravity (alone) and/or at atmospheric pressure.

Thus, the level of contaminant (e.g., chlorine) reduction in filter as you pour systems can be (primarily) a function of flow rate. Furthermore, within the range of flow rates disclosed herein, slower flow rates (1 GPM and below) have higher reduction at each pull compared to higher flow rates (1 GPM to 2 GPM). In at least one implementation, an acceptable level of filtration and/or purification can be achieved by adherence to or compliance with the NSF 42 or other standard (e.g., for drinking water treatment), as known in the art. Accordingly, in some implementations, the filter assembly and/or filter media thereof can achieve, accomplish, and/or effectuate NSF 42 standards for drinking water purification. Specifically, in at least one implementation, a single pass purification of 40 gallons (or a fortieth gallon) of water through the filter assembly and/or filter media thereof can remove up to, at least, greater than, or about 50% of free chlorine contaminant in the water.

Illustratively, while certain implementations of the present disclosure are designed, configured, operable, and/or adapted for purification at comparable levels of contaminant removal at faster speeds than existing systems, some implementations can remove a greater percentage of contaminant (e.g., chlorine) than can existing systems at the same or similar flow rate. For instance, some implementations can remove about, at least, greater than, or up to 5% more, 10% more, 15% more, 20% more, 25% more, 30% more, 35% more, 40% more, 45% more, 50% more, 100% more, 150% more, 200% more, or 300% more chlorine or other contaminants than existing systems that provide similar flow rates.

Figure 14A:
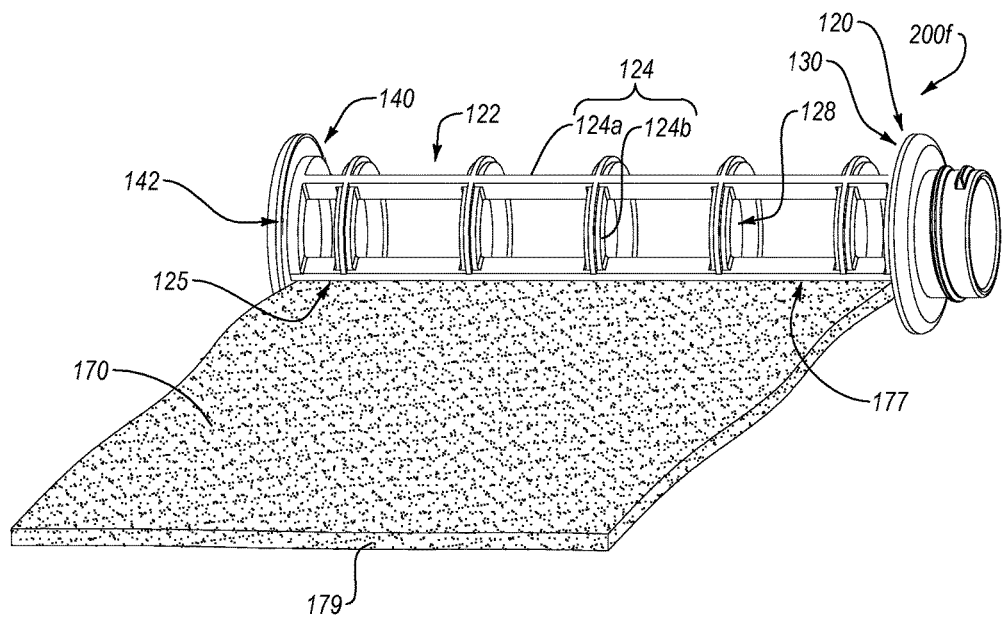
FIG. 14A illustrates a perspective view of an exemplary filter assembly in an unwrapped configuration according to another implementation of the present disclosure.
Figure 14B:
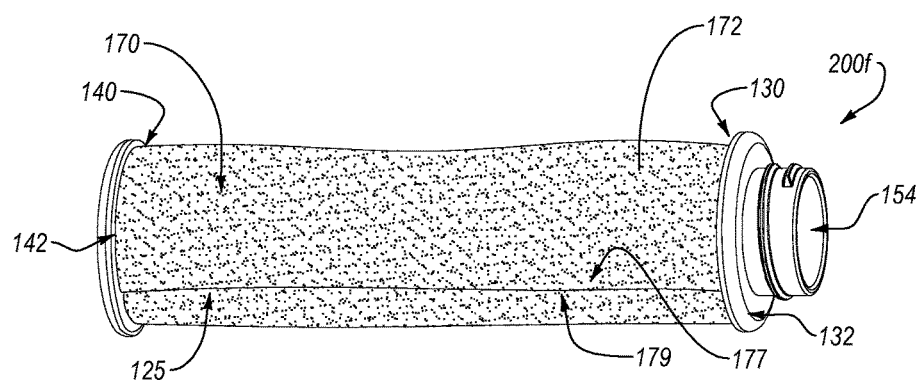
FIG. 14B illustrates a perspective view of the filter assembly of FIG. 14A in a wrapped configuration according to another implementation of the present disclosure.

To provide the described cylindrical, substantially cylindrical, partially cylindrical, and/or other curved configurations, the filter media 170 can be positioned about at least one curved portion, face, or side of a frame or with an assembly having the same. For instance, as illustrated in FIGS. 14A-14B, filter media 170 can be wrapped around the body 122 of frame 120 to form a filter assembly 200f. In some implementations, a portion of the filter media 170 is inserted into slot 125 (e.g., within frame 120 or body 122 thereof, or between support members 124). The frame 120 or filter media 170 can then be rotated such that filter media 170 is wrapped around the body 122 of frame 120.

FIG. 14B illustrates a filter media-wrapped version of filter assembly 200f, where a second end or portion of filter media 170 has been tucked or inserted into slot 125. As illustrated in FIG. 14B, filter assembly 200f lacks, is devoid of, and/or does not have an optional outer casing. However, an optional outer casing can be included in some implementations. FIGS. 14A-14B also illustrate that filter media 170 substantially covers the body of frame 120 such that water passing laterally and/or radially into or out of the central channel 128 (e.g., via openings 126 in frame 120) first passes through filter media 170 and/or is first filtered by the filter media 170.

In alternative implementations, upper or top cap 132 and/or lower or bottom cap 142 (of frame 120) can be removable. Accordingly, frame 120 can comprise a body 122 and one or more removable caps 132, 142. In addition, the filter media 170 can be optionally provided in a cylindrical and/or continuous form and slid onto or about the frame 120 or body 122 thereof (e.g., like a sleeve). In such implementations, one or more of the first end 130 and second end 140 of the frame 120 can comprise a receiving end configured to permit the sleeve to be slid onto or about the frame 120 or body 122 thereof. Such a receiving end can be devoid of the flange provided in other implementations so that the filter media sleeve can be installed without significant deformation thereof. Alternatively, a removable flange can be employed (e.g., connected to removable cap(s) 132 and/or 142) to expose the receiving end and subsequently secure the filter media about the frame or body thereof.

Furthermore, in at least one implementation, frame 120 can include one or more filter media receiving elements (e.g., disposed at first end 130 and/or second end 140 thereof). The receiving element can comprise an inward-projecting flange or lip that creates a channel for receiving an end of the filter media 170. The channel can also secure, hold, or retain filter media 170 on or about frame 120 in some implementations.

Furthermore, one or more configurations can reduce and/or eliminate the need for a slot in the frame and/or a notch in the casing. One will appreciate, however, that such features can still serve alignment or other purposes and can be included herein.

Various elements, members, and/or aspects of the present disclosure (e.g., frames, housings, flanges, casings, etc.) can be fabricated, extruded, formed, or otherwise made via injection molding or other construction technique(s) known to those skilled in the art.

Additional details of exemplary filter housings, filter assemblies, filter media, filter containers, devices, and systems, filter device lids, filter device flow control apparatus, and/or systems and methods of forming or using the same are disclosed in patent applications 15/038,982, entitled "Lid For Filter-As-You-Pour Container System"; 15/038,996, entitled "Filter Media for Filter As You Pour Filtration"; 15/038,998, entitled "Filter Assembly for Filter As You Pour Filtration"; 15/039,002, entitled "Flow Control Device For Filter As You Pour System"; 15/039,008, entitled "Container for Filter-As-You-Pour System"; and 15/039,012, entitled "Filter As You Pour System"; filed the same day as the present application and herein incorporated by reference.

It is noted that implementations of the present disclosure can include, incorporate, or otherwise comprise components, features, members, and/or elements described in other implementations disclosed herein. Accordingly, reference to a particular component, feature, member, and/or element in reference to one implementation should not be construed as being limited, necessarily, to said implementation.

Without departing from the spirit and scope of this disclosure, one of ordinary skill can make various changes and modifications to the disclosure to adapt it to various usages and conditions. As such, these changes and modifications are properly, equitably, and intended to be, within the full range of equivalence of the following claims.

The invention claimed is:

1. A filter housing, comprising:
a frame comprising a body having a first end and an opposing second end, the body comprising one or more circumferential support members that extend around less than the entire circumference of the body such that a gap is defined between first and second opposing ends of a first one of the circumferential support members, and the body defining one or more openings, the frame partially defining a channel disposed partially within the body and extending partially between the first and second ends, the one or more openings being in fluid communication with the channel, the first end having an aperture therein, the aperture being in fluid communication with the channel; and
a textile filter media having first and second terminal ends, the textile filter media surrounding the body of the frame and the first and second terminal ends positioned in the gap, wherein the textile filter media fills the gap and covers the one or more opening defined in the body;
wherein the filter housing is configured to receive the textile filter media about the body such that a majority of the filter media is maintained by the frame and wherein except for the first and second terminal ends of the filter media received in the gap, inner and outer surfaces of the filter media assume a curved configuration when the filter media is present;
wherein the textile filter media substantially precludes passage of unfiltered water through the gap and the one or more openings in the body.

2. The filter housing of claim 1, wherein the body is made of plastic.

3. The filter housing of claim 1, further comprising a plurality of axial support members extending between the first and second ends and two of the axial support members disposed in the gap defined between the first and second opposing ends of the first circumferential support member and the two axial support members spaced apart from each other so as to define part of a slot configured and arranged to receive the first and second terminal ends of the textile filter media.

4. The filter housing of claim 3, wherein the axial support members, first and second ends, and the one or more circumferential support members are all integral with each other.

5. The filter housing of claim 3, further comprising a casing secured about the frame and partially covering a portion of the body while maintaining a space between a portion of the casing and a portion of the frame, the casing comprising one or more openings in fluid communication with the channel via the one or more openings in the body, wherein the one or more openings in the casing, the space between the portion of the casing and the portion of the frame, the one or more openings in the body, the channel, and the aperture form a fluid flow path.

6. The filter housing of claim 5, wherein the filter housing is configured to receive the textile filter media in the space between the portion of the casing and the portion of the frame such that the water passing through the fluid flow path is filtered by the textile filter media.

7. The filter housing of claim 6, wherein the filter housing is configured to maintain a portion of the textile filter media in the curved configuration in the space between the portion of the casing and the portion of the frame such that the portion of the textile filter media presents a curved surface to the flow of water as the flow of water enters and/or exits the textile filter media.

8. The filter housing of claim 6, wherein the filter housing is operable to filter the water at a rate between about 0.3 GPM and about 3.0 GPM with the textile filter media positioned in the space between at least a portion of the casing and at least a portion of the frame.

9. The filter housing of claim 1, wherein the filter housing is operable to filter the water at a rate between about 0.3 GPM and about 3.0 GPM with the textile filter media positioned about the body of the frame.

10. The filter housing of claim 1, further comprising a casing configured to be disposed about an outside of the frame such that the casing and frame cooperate to define a spaced configured and arranged to receive the textile filter media between the frame and the casing, and the casing includes a plurality of radially oriented slots in fluid communication with an interior of the casing.

11. The filter housing of claim 5, wherein the casing further comprises a notch aligned with the slot, the notch being configured to secure the portion of the textile filter media within the slot.

12. The filter housing of claim 1, wherein the first end comprises a fastener for connecting the filter housing to a filter device.

13. The filter housing of claim 5, wherein the casing comprises a plurality of casing members configured to attach about the frame.

14. The filter housing of claim 5, wherein the casing comprises a sleeve configured to be slidably positioned about the frame.

15. The filter housing of claim 1, wherein the second end has a closed configuration.

16. A filter housing, comprising:
a plastic frame at least partially defining a cavity, the plastic frame having a first end and an opposing second end, the plastic frame defining a plurality of openings in fluid communication with the cavity, and the plastic frame defines an axial slot extending along a majority of a length of the plastic frame, and the axial slot communicates with an interior channel defined by the plastic frame;
a plastic casing at least partially surrounding the plastic frame and having one or more radially oriented openings therein that are disposed along a majority of a length of the plastic casing, the one or more radially oriented openings being in fluid communication with the cavity, and each of the radially oriented openings has a smaller area than an area of each of the openings defined by the plastic frame; and
a filter media receiving area defined between an inner portion of the plastic casing and an outer portion of the plastic frame, the filter media receiving area being in fluid communication with the one or more radially oriented openings in the plastic casing and with the cavity, and the filter media receiving area having a depth that is about the same as a thickness of a single flattened sheet of filter media, the first end of the plastic frame comprising a first cap having a first inner surface, a first outer surface, and a first circumferential out edge, the first end of the plastic frame having an aperture therein, the aperture being in fluid communication with the cavity such that a fluid can flow between the aperture and the one or more radially oriented openings via the cavity and the filter media receiving area, the second end of the plastic frame comprising a second cap having a second inner surface, second outer surface, and a second circumferential out edge, the second end of the plastic frame having a closed configuration such that the fluid is prohibited from flowing therethrough, the plastic casing having a first end engaging the first inner surface of the first cap and extending radially out to the first circumferential outer edge, the plastic casing having a second end engaging the second inner surface of the second cap and extending radially out to the second circumferential outer edge, and the filter housing being configured to receive a filter media in the filter media receiving area such that a fluid passing between the one or more radially oriented openings in the plastic casing and the cavity is filtered by the filter media when the filter media is present in the filter media receiving area.

17. The filter housing of claim 16, wherein the first end and the second end of the plastic frame comprise a first flange and a second flange, respectively.

18. The filter housing of claim 16, wherein the filter housing is configured to permit the fluid to enter the cavity laterally through the one or more radially oriented openings in the plastic casing.

19. The filter housing of claim 16, wherein the filter housing is configured to maintain a portion of the filter media in a curved configuration in the filter media receiving area such that the portion of the filter media, when present, presents a curved surface to a flow of fluid as the flow of fluid enters and/or exits the portion of the filter media.

20. The filter housing of claim 16, wherein the plastic frame comprises one or more support members positioned between the cavity and the filter media receiving area, the one or more support members being configured to interface with the filter media such that the filter media is maintained partially within the filter media receiving area.

21. The filter housing of claim 20, wherein the one or more support members comprises a plurality of support members that cooperate to define the axial slot.

22. The filter housing of claim 20, wherein the one or more support members comprises a plurality of support members extending axially between the first and second ends and a plurality of support members extending circumferentially about the plastic frame.

23. The filter housing of claim 16, wherein the casing comprises a securing element configured to secure a portion of the filter media within the filter media receiving area.

24. A filter housing, comprising:
a plastic frame having a first end, an opposing second end, and a framework extending between the first and second ends, the framework comprising one or more axial support members extending between the first and second ends and one or more circumferential support members connected to the one or more axial support members, each of the circumferential support members extending around less than the entire circumference of the body and having a first end that terminates at a first one of the axial support members and a second end that terminates at a second one of the axial support members, and the first and second axial support members are spaced apart from each other such that an axially oriented and unobstructed slot is defined between the first and second axial support members, the framework partially defining a cavity and a plurality of openings, the first end having an aperture therein, the aperture and the plurality of openings in the framework being in fluid communication with the cavity, the second end having a closed configuration; and
a plastic casing removably secured about the plastic frame and partially covering the framework while maintaining a space between a portion of the plastic casing and a portion of the framework, the space having a depth that is about the same as a thickness of a single flattened sheet of textile filter media, the plastic casing defining a plurality of radially oriented openings that are disposed along a majority of a length of the plastic casing and are in fluid communication with the cavity via the plurality of openings in the framework, and each of the radially oriented openings has a smaller area than an area of each of the openings defined by the plastic frame;
the first end of the plastic frame comprising a first cap having a first inner surface, a first outer surface, and a first circumferential outer edge,
the second end of the plastic frame, comprising a second cap having a second inner surface, second outer surface, and a second circumferential outer edge,
the plastic casing having a first end engaging the first inner surface of the first cap and extending radially out to the first circumferential outer edge,
the plastic casing having a second end engaging the second inner surface of the second cap and extending radially out to the second circumferential outer edge, and
wherein the plurality of openings in the plastic casing, the plurality of openings in the framework, the cavity, and the aperture collectively form a fluid flow path,
the filter housing being configured to receive a portion of the textile filter media in the space between the portion of the outer casing and the portion of the framework such that the textile filter media is maintained in a curved configuration such that a fluid passing through the flow path is filtered by a curved surface of the textile filter media.

* * * * *